US007224488B2

(12) United States Patent
Inoue

(10) Patent No.: US 7,224,488 B2
(45) Date of Patent: May 29, 2007

(54) METHOD OF CORRECTING THRESHOLD ARRAY, DOT PATTERN DATA STRUCTURE, METHOD OF CORRECTING PIXEL LAYOUT OF IMAGE, AND METHOD OF DETERMINING THRESHOLD ARRAY FOR GENERATING IMAGE

(75) Inventor: Yoshiaki Inoue, Odawara (JP)

(73) Assignee: Fujifilm Corporation, Tokyo (JP)

( * ) Notice: Subject to any disclaimer, the term of this patent is extended or adjusted under 35 U.S.C. 154(b) by 1083 days.

(21) Appl. No.: 10/166,003

(22) Filed: Jun. 11, 2002

(65) Prior Publication Data

US 2002/0186417 A1  Dec. 12, 2002

(30) Foreign Application Priority Data

Jun. 12, 2001  (JP)  ............... 2001-177363
Nov. 2, 2001  (JP)  ............... 2001-337873

(51) Int. Cl.
  H04N 1/405  (2006.01)
  H04N 1/409  (2006.01)
  G06T 5/00  (2006.01)

(52) U.S. Cl. ............... 358/3.13; 358/3.14; 358/3.17; 358/3.2

(58) Field of Classification Search ............... 358/3.13, 358/3.16, 3.17, 3.18, 3.19, 534, 535, 536, 358/463, 3.22, 3.06, 3.14, 3.2, 3.26
See application file for complete search history.

(56) References Cited

U.S. PATENT DOCUMENTS 3,922,484 A * 11/1975 Keller .................. 358/534

| | | | |
|---|---|---|---|
| 5,825,932 A | 10/1998 | Inoue | |
| 6,172,770 B1 | 1/2001 | Inoue | |
| 6,515,768 B1 * | 2/2003 | Deschuytere et al. | 358/3.06 |
| 6,515,770 B1 * | 2/2003 | Rao et al. | 358/3.13 |
| 6,989,913 B2 * | 1/2006 | Asai | 358/1.9 |

FOREIGN PATENT DOCUMENTS

| | | |
|---|---|---|
| JP | 8-317212 | 11/1996 |
| JP | 11-112814 | 4/1999 |
| JP | 2001-189859 | 7/2001 |

OTHER PUBLICATIONS

"Postscript screening" written by Peter Fink, published by MDN corporation of Aug. 11, 1994, 1st edition.
U.S. Appl. No. 09/775,615, filed Feb. 5, 2001.
U.S. Appl. No. 10/166,164, filed Jun. 11, 2002.

* cited by examiner

Primary Examiner—Thomas D. Lee
(74) Attorney, Agent, or Firm—Sughrue Mion, PLLC

(57) ABSTRACT

A threshold array having an array of thresholds for reproducing a gradation with a dot pattern as a clustered pattern of dots each made up of one or more blackening pixels is corrected. At least one non-contact point candidate position to be turned into a non-contact point is determined among contact points of the dots. Then, at least one contact point candidate position to be turned into a contact point is determined among non-contact points of the dots at the given gradation. Thereafter, the threshold array is corrected by switching around a threshold for the non-contact point candidate position and a threshold for the contact point candidate position, whereby the layout of contact points of the dots can be corrected.

19 Claims, 30 Drawing Sheets

FIG. 14
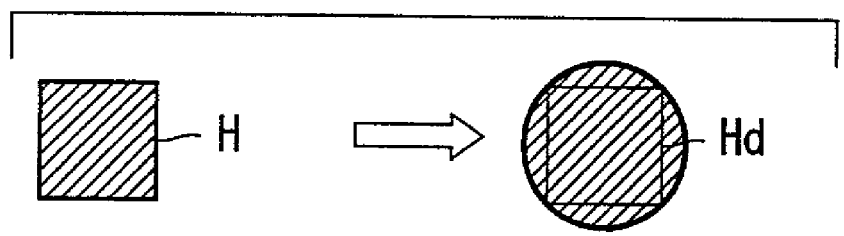
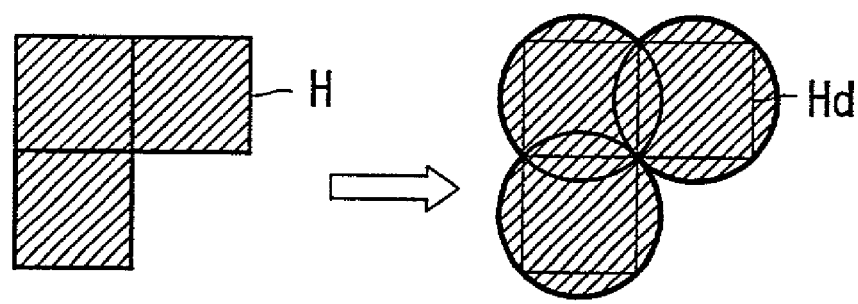
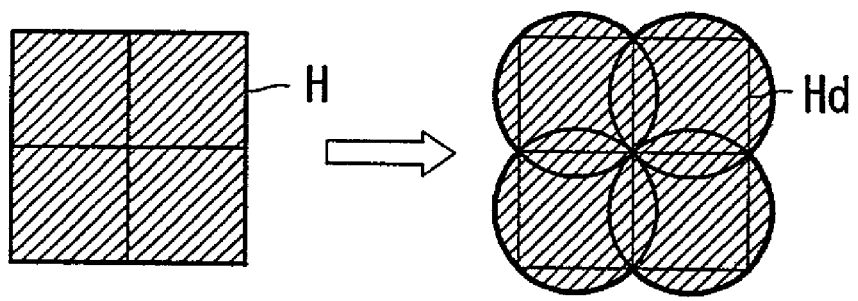

METHOD OF CORRECTING THRESHOLD ARRAY, DOT PATTERN DATA STRUCTURE, METHOD OF CORRECTING PIXEL LAYOUT OF IMAGE, AND METHOD OF DETERMINING THRESHOLD ARRAY FOR GENERATING IMAGE

BACKGROUND OF THE INVENTION

1. Field of the Invention

The present invention relates to a method of correcting a threshold array, a dot pattern data structure, a method of correcting a pixel layout of an image, and a method of determining a threshold array for generating an image, suitable for use in halftone image output apparatus in printing applications, such as a color scanner, an image setter, a CTP (Computer To Plate) apparatus, a CTC (Computer To Cylinder) apparatus, a DDCP (Direct Digital Color Proof) apparatus, or the like, or apparatus for outputting continuous gradation images as binary or multivalued images, such as electrophotographic or ink-jet image output apparatus.

2. Description of the Related Art

For reproducing an original image on a print in the printing and platemaking fields, it is customary to transfer an ink from a printing plate on a printing press to a printing sheet to form the image thereon.

There is known in the art an area gradation reproducing process for reproducing an original image on a print by converting the image into a dot pattern made up of a plurality of halftone dots.

Such a dot pattern is also formed on a printing plate, which is either generated from a film outputted by the image setter or generated directly by the CTP apparatus or the CTC apparatus.

The dot pattern formed on the film or the printing plate is generated in advance by an image processing apparatus such as a workstation or the like.

FIG. 30 of the accompanying drawings schematically shows a dot pattern to be formed on a film or a printing plate, as displayed on a display unit of an image processing apparatus.

As shown in FIG. 30, each dot 1 is comprised of a cluster of blackening pixels in a dot cell (also referred to as "cell") 2 which is made up of n×n (e.g., 8×8 in FIG. 30) pixels. Each dot 1 shown in FIG. 30 is a so-called digital dot handled in an image processing apparatus. While a digital dot has angular corners, a dot that is actually formed on a print may have round corners due to a so-called dot gain.

In the example shown in FIG. 30, the halftone % (halftone percentage) of the upper left dot 1 is about 6.3%, the halftone % of the upper right dot 1 is about 18.8%, and the halftone % of each of the two lower dots 1 is 50%.

The pitch of each of the dot cells 2 is expressed by the reciprocal of the screen ruling. The screen ruling is defined as the number of columns (lines/inch) of the dot cell 2 that are included per inch.

The resolution of an output machine (referred to as "output resolution") such as a color scanner, an image setter, a CTP apparatus, a CTC apparatus, a DDCP system, etc., or the resolution of the dot pattern in FIG. 30, is defined as the number of pixels per inch (pixels/inch).

The inventor of the present application has heretofore proposed a technique for optimizing a layout of blackening pixels or a threshold array (also referred to as "halftone threshold data") which determines a layout of blackening pixels within a so-called supercell that is made up of many dot cells 2, in order to reduce undesirable fringes (hereinafter referred to as "single-plate moiré" because they are produced on one plate rather than on superposed plates) generated by the interference between the output resolution and the screen ruling (see, for example, the invention disclosed in Japanese Laid-Open Patent Publication No. 11-112814 (hereinafter referred to as "first technique")).

For details of a supercell itself and the generation of halftone dots in relation to a supercell, reference should be made to, for example, a book entitled "Postscript screening" written by Peter Fink, published by MDN corporation on Aug. 11, 1994, 1st edition, 1st printing.

Contact points of dots 1, e.g., contact points 3 where blackening pixels of the lower dots 1 in FIG. 30 are connected to each other, are known as points which exhibit a singular behavior referred to as a tone jump under the influence of an optical dot gain in the area gradation reproducing process. Specifically, it is known that the image density of an image (halftone image or dot pattern) made up of printed dots varies discretely beyond a density that is calculated from the halftone % of the area gradation.

One technique for eliminating or reducing such a tone jump is disclosed in Japanese Laid-Open Patent Publication No. 2001-189859 (hereinafter referred to as "second technique").

According to the second technique, dots in a supercell are not held in contact with each other at a certain gradation, but the blackening pixels of the contact points 3 of the dots 1 are held in contact with each other progressively at gradations across the halftone % of 50%.

The second technique makes it possible to eliminate or reduce a tone jump. However, the inventor of the present application has found that since the second technique does not take into account a spatial regularity of contact points 3 of the dots 1, i.e., a regularity on a dot pattern, if the contact points of dots making up a dot pattern are arranged regularly in space, the contact dots may possibly be visually perceived a single-plate moiré at gradations across the halftone % of 50%, e.g., in a gradation range of 50±5%, on a print.

The inventor of the present application has also found that when the resolution of an output apparatus is reduced to generate a halftone image (dot pattern) with a high screen ruling, a single-plate moiré poses a problem if the ratio of the resolution to the screen ruling (resolution/screen ruling) is 10 or smaller.

It has been pointed out in Japanese Laid-Open Patent Publication No. 8-317212 that a moiré pattern caused by the interference between the output resolution and the screen ruling, i.e., a single-plate moiré, occasionally occurs on images outputted from a halftone image output apparatus such as an image setter or the like which forms a binary halftone image (gradation image) made up of blackening and non-blackening portions produced by turning on and off a laser beam, on a photographic sheet or film The single-plate moiré comprises a periodic pattern of dots, i.e., periodic interference fringes produced between the pitch of dot cells 2 and the pitch of scanning lines. The periodic interference fringes act as a low-frequency noise component, and degrading the image quality.

The inventor of the present application has proposed techniques for reducing such a low-frequency noise component in Japanese Laid-Open Patent Publication No. 11-112814 (the first technique) and Japanese Patent Application No. 2001-2528838 (hereinafter referred to as "third technique", corresponding to Japanese Laid-Open Patent Publication No. 2001-292317).

The first technique is represented by a process of correcting a pixel array of halftone image data or an existing threshold array for generating the halftone image data by converting halftone image data in a position space or density distribution data generated from the halftone image data in view of the characteristics of an output apparatus and a recording material into data in a frequency space, extracting a low-frequency component from the data in the frequency space, and comparing noise image data produced by inversely converting the low-frequency component with the halftone image data.

According to the first technique, the corrected array of halftone image data and the corrected threshold array themselves become an array which is not susceptible to low-frequency noise.

The third technique does not correct an existing threshold array, but generates, from the outset, a threshold array which is not susceptible to low-frequency noise, or stated otherwise, not susceptible to single-plate moiré when a halftone image is outputted. Therefore, the third technique is high in freedom for processing image data, and provides a high single-plate moiré reducing capability for halftone images generated using the threshold array.

According to the first and third moiré reducing techniques, the resolution is of a relatively high value, e.g., 2400 dpi (dots per inch equivalent to pixels per inch), and the screen ruling is of 175 lpi (lines per inch).

The above techniques are preferably applicable to a threshold array for generating halftone images where the number of pixels per dot (about 188 ($=(2400/175)^2$) in the above example) is relatively large.

Under the conditions of 2400 dpi and 175 lpi, however, while images generated by printing-related apparatus including a color scanner, an image setter, a CTP apparatus, a CTC apparatus, a DDCP apparatus, etc. have a desired level of quality, the amount of data that is processed is large, and the time required to process data and output data is increased.

The inventor of the present application has found that under conditions in which the output resolution and the screen ruling are likely to interfere with each other and a single-plate moiré is likely to occur, e.g., under output conditions represented by the resolution of 1200 dpi and the screen ruling of 175 lpi, or generally, under output conditions represented by the ratio of the output resolution (dpi)/the screen ruling (lpi) which is 10 or less, the proportion of one pixel in a dot is large, resulting in an increased quantization error, and the moiré remains unremoved even by the first and third techniques.

Actually, an image outputted under the conditions of 1200 dpi and 175 lpi and an image outputted under the conditions of 2000 dpi and 175 lpi have respective pixel sizes of about 21 μm and 13 μm, and hence are fine enough for the human vision to be unable distinguish their resolutions.

If it is possible to eliminate a single-plate moiré from an image outputted under the conditions of 1200 dpi and 175 lpi which are subject to a greater quantization error than the conditions of 2000 dpi and 175 lpi, then since the number of pixels per unit length can be reduced, the structure of printing-related apparatus including a color scanner, an image setter, a CTP apparatus, a CTC apparatus, a DDCP apparatus, etc. can be simplified, and their processing speed can be increased.

SUMMARY OF THE INVENTION

It is therefore an object of the present invention to provide a method of correcting a threshold array and a dot pattern data structure which are capable of eliminating or reducing a single-plate moiré caused due to the layout of contact points of dots.

Another object of the present invention is to provide a method of correcting a pixel layout of an image to reduce a low-frequency noise component such as a single-plate moiré in the image by correcting the layout of blackening pixels in the image in a certain gradation which is made up of a dot pattern represented by a cluster of dots comprising one or more blackening pixels.

Still another object of the present invention is to provide a method of determining a threshold array, which is less susceptible to low-frequency noise such as a single-plate moiré, for generating an image which is made up of a dot pattern, based on a dot pattern that is given at a certain gradation.

If it is assumed for an easier understanding that the density of an input image is uniform, then a moiré pattern is generated in an output image reproduced by a gradation reproducing method based on a process using a threshold array (hereinafter referred to as "threshold process") because a pattern corresponding to the threshold array is repeated. A moiré pattern generated due to the interference between an output resolution and a screen ruling is considered to be one of threshold-based periodic components in the case where halftone dots are used in the threshold process (a method of reproducing an image where dots having substantially equivalent sizes are arrayed). Therefore, the method according to the present invention serves to reduce a periodic component caused by thresholds produced in all gradation reproducing methods which can employ the threshold process.

According to the present invention, a method of correcting a threshold array having an array of thresholds for reproducing a gradation with a dot pattern as a clustered pattern of dots each made up of one or more blackening pixels comprises steps (A), (B), and (C). The step (A) determines at least one non-contact point candidate position to be turned into a non-contact point, among contact points of the dots at a given gradation. The step (B) determines at least one contact point candidate position to be turned into a contact point, among non-contact points of the dots at the given gradation. The step (C) corrects the threshold array by switching around a threshold for the non-contact point candidate position determined in the step (A) and a threshold for the contact point candidate position determined in the step (B), whereby the layout of contact points of the dots can be corrected.

With the above arrangement, the layout of contact point positions of the dots of the dot pattern is changed by switching around the thresholds in the predetermined threshold array. In this manner, fringes generated by the interference between the output resolution and the screen ruling, i.e., single-plate moiré, can be eliminated or lessened in the dot pattern.

Each of the steps (A), (B) comprises the steps of analyzing, for frequencies, the dot pattern in which about half of the contact points of the dots are held in contact with other contact points, to determine particular frequency components, thereafter determining intensities of the particular frequency components at the non-contact point candidate position, determining intensities of the particular frequency components at the contact point candidate position, and determining the non-contact point candidate position and the contact point candidate position based on the magnitude of the determined intensities. Thus, the positions of the thresholds to be switched around can be determined specifically.

If the dot pattern has a resolution represented by pixels/inch and the dots have a screen ruling represented by lines/inch, then the quotient produced by dividing the resolution of the dot pattern by the screen ruling has a value of at most 10. Therefore, single-plate moiré can be eliminated or reduced more effectively.

According to the present invention, there is also provided a dot pattern data structure of a dot pattern as a clustered pattern of dots each made up of one or more blackening pixels, wherein the dots are of substantially uniform sizes and arranged at substantially equal intervals in rows and columns perpendicular thereto, the dots having contact points arranged in an irregular layout. The dot pattern data structure is highly effective to eliminate or reduce single-plate moiré.

According to the present invention, there is also provided a method of correcting the layout of blackening pixels in an image of a given gradation which is formed of a dot pattern as a clustered pattern of dots each made up of one or more blackening pixels, comprising the steps of selecting at least one of whitening pixels around blackening pixels forming a profile of each of the dots of the image of the given gradation, as a blackening candidate pixel at a gradation next to the given gradation, extracting a low-frequency component from the image of the given gradation, analyzing the extracted low-frequency component for frequencies to divide the extracted low-frequency component into a plurality of frequency components, and determining an intensity of a blackening candidate pixel position in an intensity-modulated image represented by the divided frequency components, determining the blackening candidate pixel whose intensity at the blackening candidate pixel position is weak as a blackening pixel at the next gradation, selecting at least one blackening pixel as a whitening candidate pixel at the given gradation, among blackening pixels forming a profile of each of the dots of an image of a gradation next to the given gradation to which the determined blackening pixel is applied, extracting a low-frequency component from the image of the gradation next to the given gradation to which the determined blackening pixel is applied, analyzing the extracted low-frequency component for frequencies to divide the extracted low-frequency component into a plurality of frequency components, and determining an intensity of a whitening candidate pixel position in an intensity-modulated image represented by the divided frequency components, and determining the whitening candidate pixel whose intensity at the whitening candidate pixel position is strong as a whitening pixel at the given gradation.

With the above arrangement, after a low-frequency component is extracted from an image, it is analyzed for frequencies, and the positions of blackening pixels are corrected based on the frequency analysis, thus reducing low-frequency noise components in the image.

The step of determining the blackening candidate pixel whose intensity at the blackening candidate pixel position is weak as a blackening pixel at the next gradation may comprise the step of determining blackening candidate pixels whose intensities of at least two of the divided frequency components are weak as blackening pixels at the next gradation, and the step of determining the whitening candidate pixel whose intensity at the whitening candidate pixel position is strong as a whitening pixel at the given gradation may comprise the step of determining whitening candidate pixels whose intensities of at least two of the divided frequency components are strong as whitening pixels at the given gradation, so that low-frequency components can be suppressed more reliably.

Corrective candidates for blackening pixel positions may be among an image of the next gradation or an image of the present gradation.

In the latter case, the step of determining the whitening candidate pixel whose intensity at the whitening candidate pixel position is strong as a whitening pixel may comprise the step of determining whitening candidate pixels whose intensities of at least two of the divided frequency components as whitening pixels are strong, and the step of determining the blackening candidate pixel whose intensity at the blackening candidate pixel position is weak as a blackening pixel at the given gradation may comprise the step of determining blackening candidate pixels whose intensities of at least two of the divided frequency components are weak as blackening pixels at the given gradation, so that low-frequency components can be suppressed more reliably.

Each of the steps of extracting a low-frequency component from the image may comprise the steps of converting the image into an image to be reproduced on a recording medium, and determining corrective candidates for the blackening pixel positions, for reducing, more accurately, low-frequency noise components in the image reproduced on the recording medium.

Each of the steps of extracting a low-frequency component from the image may alternatively comprise the steps of weighting the image according to human visual characteristics and extracting a low-frequency component from the weighted image, for extracting the low-frequency component in a manner closer to a form that is visually recognized by human beings.

According to the present invention, there is further provided a method of determining a threshold array for generating an image which is formed of a dot pattern as a clustered pattern of dots each made up of one or more blackening pixels, comprising the steps of, when the positions of one or more thresholds having the same value of a next gradation higher than a given gradation are to be determined in case a dot pattern of the given gradation is given, (A) selecting one or more candidate positions for the positions of one or more thresholds of the next gradation higher than the given gradation, based on the dot pattern of the given gradation, (B) determining the positions of thresholds of the next gradation higher than the given gradation among the candidate positions, the step (B) comprising the first step of extracting a low-frequency component from the dot pattern of the given gradation, the second step of dividing the extracted low-frequency component into one or more particular frequency components, the third step of determining intensities of the particular frequency components at the candidate positions, the fourth step of determining a candidate position whose determined intensities of the particular frequency components are weak as a position of a threshold of the next gradation higher than the given gradation, and the fifth step of repeating the first through fourth steps until all positions of one or more thresholds having the same value of the next gradation higher than the given gradation are determined. According to the method, the positions of thresholds of all gradations higher than the given gradation can be determined.

The letters (A), (B) added with respect to some of the above steps are used for an easier understanding of the present invention.

With the above arrangement, positions of thresholds of all gradations higher than the given gradation can be determined from the dot pattern of the given gradation. A gradation image generated using the threshold array thus determined contains highly suppressed unwanted low-frequency components.

Unwanted low-frequency components may be suppressed more effectively by determining the position of the threshold determined in the fourth step as a candidate position whose intensity of at least two of the divided frequency components is weak.

Positions of thresholds of all gradations lower than the given gradation may also be determined from the dot pattern of the given gradation.

Consequently, positions of thresholds of all gradations, i.e., a threshold array, can be determined from a dot pattern given in a certain gradation.

Any unwanted low-frequency components are small in a gradation image that is generated using such a threshold array thus obtained.

In this case, unwanted low-frequency components may also be suppressed more effectively by determining the position of the threshold determined in the fourth step as a candidate position whose intensity of at least two of the divided frequency components is weak.

The first step may comprise the steps of converting the dot pattern into an image predicted by calculations which is to be reproduced on a recording medium, and extracting a low-frequency component from the predicted image, so that unwanted low-frequency components in an image that is actually outputted from an image output apparatus can be suppressed.

Furthermore, the first step of extracting a low-frequency component from the dot pattern may comprise the steps of weighting the dot pattern according to human visual characteristics and extracting a low-frequency component from the weighted image, for extracting the low-frequency component in a manner closer to a form that is visually recognized by human beings.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 14 is a diagram illustrative of a density simulation;

DESCRIPTION OF THE PREFERRED EMBODIMENT

Figure 1:
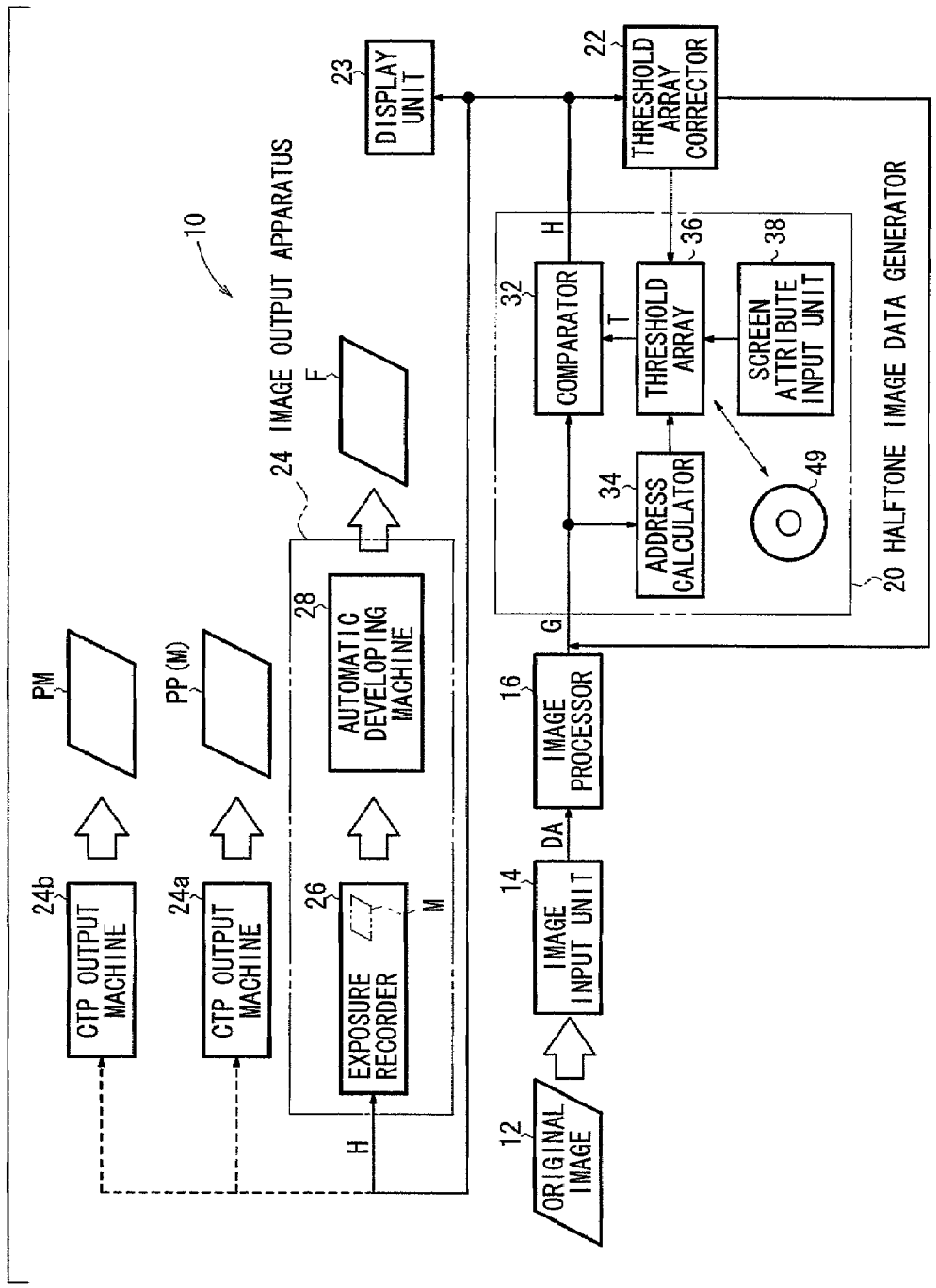
FIG. 1 is a block diagram of a platemaking system which incorporates a threshold array according to an embodiment of the present invention.

FIG. 1 shows in block form a basic arrangement of a platemaking system 10 which incorporates a supercell threshold template (supercell threshold array) 36 according to an embodiment of the present invention.

As shown in FIG. 1, the platemaking system 10 basically comprises an image input unit 14, an image processor 16, a halftone image data generator (dot pattern generator) 20 as a gradation image generator, a threshold array corrector 22, and an image output apparatus 24.

The platemaking system 10 is a system for forming an image on a film F. The image is read from an original image 12 by the image input unit 14 such as a scanner or the like, and is reproduced as a dot pattern which is a cluster of dots comprising one or more blackening pixels.

Functions of the halftone image data generator 20 and the threshold array corrector 22 will be performed by a workstation or a personal computer (not shown).

In the image input unit 14, light reflected from or transmitted through the original image 12 which is irradiated by light from a light source and fed in an auxiliary scanning direction by a feed mechanism is applied to a photoelectric transducer such as a linear image sensor, which is electrically scanned in a main scanning direction. The photoelectric transducer converts the light reflected from or transmitted through the original image 12 into an electric image signal (pixel signal). The image signal is then converted by an A/D converter into 8-bit digital image data (simply referred to as "image data") DA which has values 0, 1, . . . , 255.

The image input unit 14 is not limited to a scanner, but may be in the form of any medium capable of outputting digital image data, such as an image recording disk (image recording medium) such as a DVD or the like, a communication network, a digital still camera, or the like.

The image data DA outputted from the image input unit 14 is processed for color correction, sharpness, etc. by the image processor 16, which generates processed image data G. Practically, the function of the image processor 16 will be also performed by a workstation or a personal computer (not shown).

In the present embodiment, the image output apparatus 24 has a resolution, i.e., an output resolution of 1200 scanning pixels/inch, for example.

The image output apparatus 24 may have resolution ranging from 900 to 5000 pixels per inch.

The processed image data G outputted from the image processor 16 is supplied to the halftone image data generator 20. The halftone image data generator 20 may also be supplied directly with digital image data generated and processed by a medium such as a digital camera or the like, as the image data G.

The halftone image data generator 20 comprises a comparator 32, an address calculator 34, a threshold array storage unit 36 as a storage medium for storing a plurality of threshold arrays (equivalent to threshold data or threshold matrices) such as supercell threshold templates or the like (the stored threshold arrays are also denoted by 36), and a screen attribute input unit 38 as a selecting means for selecting a desired one of the threshold arrays stored in the threshold array storage unit 36.

The image data G supplied to the halftone image data generator 20 is applied to a comparison input terminal of the comparator 32. The address calculator 34 calculates, from the image data G, an address AD=AD (x, y) representing x- and y-axis addresses on the threshold array 36.

The threshold array 36 reads a threshold (threshold data of 8 bits representing a value ranging from 1 to 255 (more accurately a value obtained by subtracting 1 from 8 bits, but hereinafter referred to as 8 bits for convenience)) T stored in the address AD specified by the address calculator 34, and supplies the threshold T to a reference input terminal of the comparator 32.

As the threshold array 36, there is used a threshold array among a plurality of threshold arrays 36 which corresponds to screen attributes (a screen ruling, a screen angle, and a screen shape) specified by the screen attribute input unit 38. In the present embodiment, it is assumed that the screen ruling is 175 lpi, the screen angle is 15°, and the screen shape is a square shape, for example. Specifically, the threshold array 36 may be a threshold array produced according to the first technique described above. In the present embodiment, the quotient produced by dividing the output resolution by the screen ruling is about 6.9 (1200÷175). The output resolution is relatively high, and the screen ruling is high.

The screen ruling may be of any value selected from a range from 50 to 600 lpi, such as 85 lpi, 175 lpi, 300 lpi, etc.

As described above, a supercell comprises a plurality of dot cells. In the art of generating halftone dots, it is customary to set up a supercell on a pixel grid determined depending on the output resolution, divide the supercell into dot cells, and assign thresholds respectively to pixels in the divided dot cells for thereby generating a threshold array 36. The supercell with the thresholds assigned to the dot cells is referred to a supercell threshold template, i.e., a threshold array 36.

A supercell which comprises a plurality of dot cells makes it possible to change the screen ruling and the screen angle at smaller intervals, allowing the selection of values closer to a screen ruling and a screen angle which have been specified.

A pixel grid refers to a cluster of pixels as blackening units, and may be perceived as a matrix of pixels arranged in rows and columns at a specified output resolution.

The comparator 32 compares the image data G with the threshold T, and generates halftone image data H as gradation image data representing a dot pattern having a value of 1 or 0 (G≧T→1 (on or blackening), G<T→0 (off, blank, unblackening, or whitening).

The generated halftone image data H, i.e., the gradation image data, is supplied to a display unit 23 such as a CRT monitor and an exposure recorder 26 of the image output apparatus 24. An image displayed on the display unit 23 based on the generated halftone image data H is a gradation image generated as a clustered pattern of dot cells having dots comprising 0 or 1 or more blackening pixels, i.e., a dot pattern.

In the exposure recorder 26, a photosensitive medium M is exposed to and scanned by a laser beam (recording beam) that is selectively turned on and off depending on the halftone image data H, forming a halftone image as a latent image on the photosensitive medium M. The halftone image formed on the photosensitive medium M is then developed into a visible halftone image by an automatic developing machine 28, which produces a film F with the visible halftone image formed thereon. The film F is used as an original plate, and a printing plate is produced from the film F. The produced printing plate is mounted on a printing press, not shown, and an ink is applied to the mounted printing plate.

The ink applied to the printing plate is then transferred to a printing sheet, thus producing a desired printed material with the image recorded on the sheet.

The principles of the present invention are applicable to not only the image output apparatus 24 for outputting a film F as an original plate, but also a CTP (Computer To Plate) output machine 24a which is capable of directly outputting a printing plate PP based on the halftone image data H. In the CTP output machine 24a, a photosensitive medium M is scanned by a laser beam (recording beam) to produce a printing plate PP directly.

The image output apparatus is not limited to a scanning exposure apparatus using a laser beam, but may be an apparatus for producing a film, a printing plate, or a printed material according to a surface exposure process or an ink jet process.

The principles of the present invention are also applicable to a CTC (Computer To Cylinder) output machine 24b. In the CTC output machine 24b, a photosensitive medium M wound around a cylinder is scanned by a laser beam to produce a printing plate based on the halftone image data H, and an ink is applied to the printing plate and then transferred to a printing sheet, thus producing a desired printed material PM with the image recorded on the sheet.

The threshold array 36 of the halftone image data generator 20 shown in FIG. 1 may be recorded on a portable storage medium 49 which may be a package medium such as a CDROM (Compact Disc Read-Only Memory), a CDR (Compact Disk Recordable), etc. The threshold array 36 may be transmitted as data in a wireless manner or via a wire.

In the present embodiment, the threshold array 36 is stored in a storage medium such as a hard disk incorporated in a personal computer or the like.

The basic arrangement of the platemaking system 10 which incorporates which incorporates a supercell threshold array 36 according to the present invention has been described above.

Figure 2:
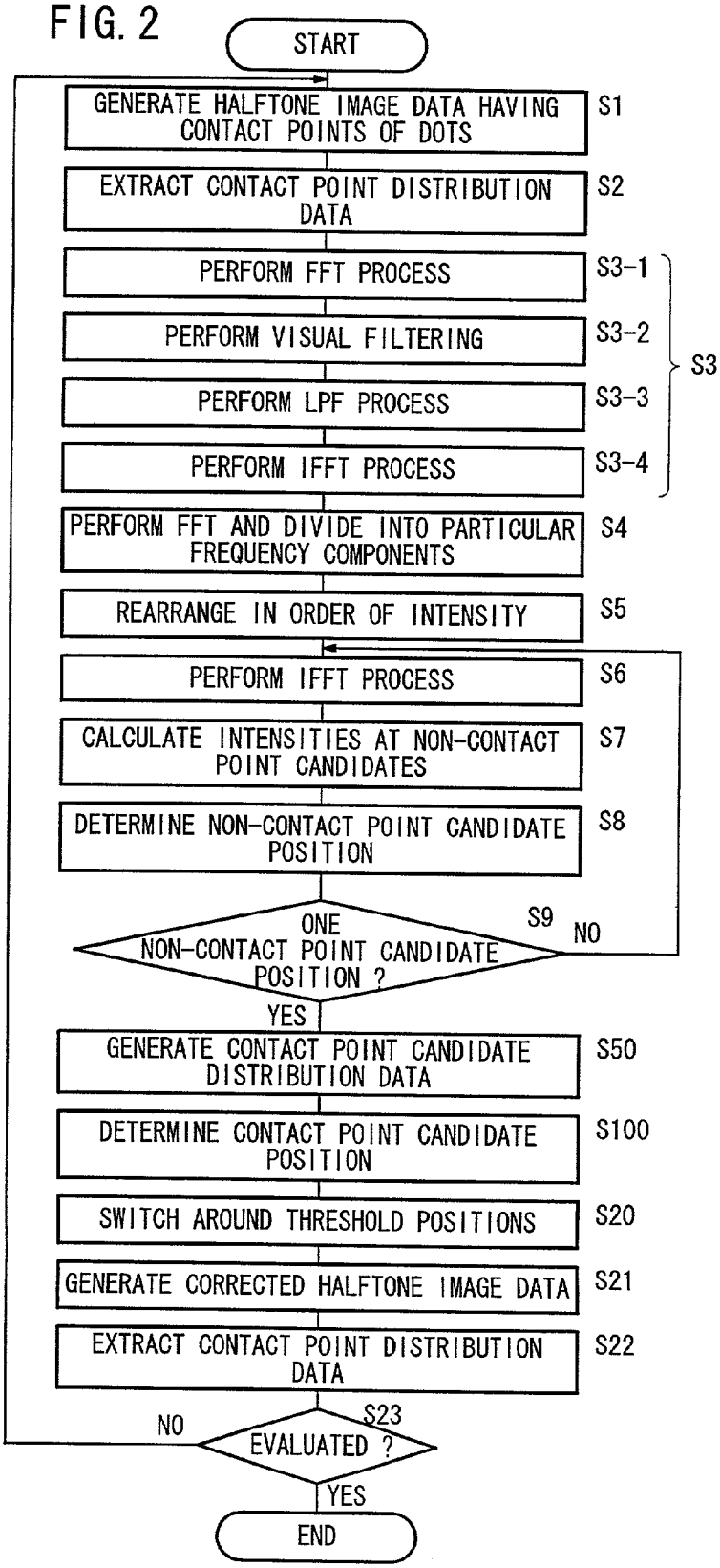
FIG. 2 is a flowchart of a process of rearranging thresholds.

A method of correcting the threshold array 36 to eliminate or reduce a single-plate moiré will be described below with reference to FIG. 2. The method of correcting the threshold array 36 as shown in FIG. 2 is carried out by the threshold array corrector 22 shown in FIG. 1. An image generated by the threshold array corrector 22 can be displayed on the display unit 23.

In step S1, the threshold array corrector 22 generates halftone image data H having contact points of dots. Specifically, the threshold array corrector 22 generates halftone image data H (H=Ha) where about half of contact points of the dots making up the halftone image data H are held in contact with other contact points.

Figure 30:
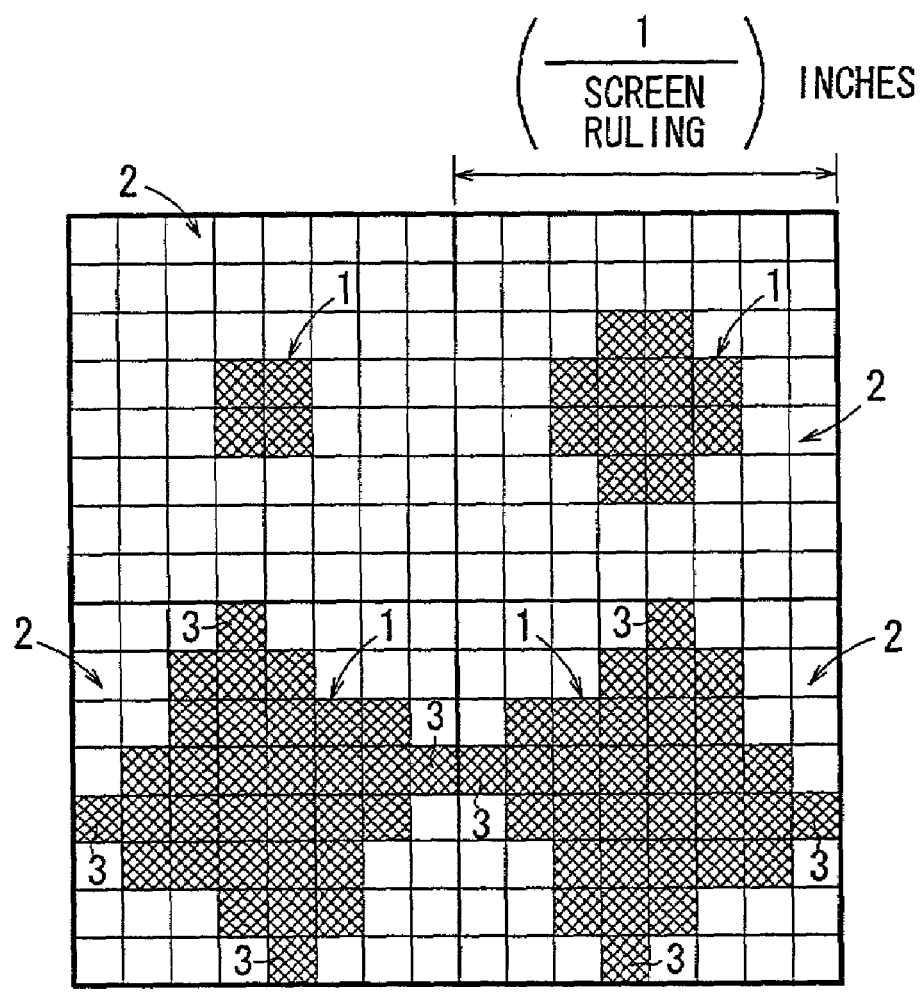
FIG. 30 is a diagram which is illustrative of a general dot pattern.

As can be understood from a lower half of FIG. 30, each of the dots 1 where the halftone % is 50% has as many contact points (contact pixels) 3 as half of upper, lower, left, and right locations, i.e., two locations. Of these two locations, one location is held in contact with another adjacent dot 1, a state in which about half of contact points 3 of the dot 1 are held in contact with other contact points.

If the dot shape is square, then the halftone % of the halftone image data H where all contact points 3 of dots 1 are held in contact is basically 50%. The halftone % of the halftone image data H where all contact points 3 of dots 1 are held in contact with other contact points varies with the dot shape.

The state in which about half of contact points 3 of the dot 1 are held in contact with other contact points is a state in which there are as many contact points 3 as the number of dots 1 in the dot pattern because (the number of dots×4÷2)÷2=(the number of contact points of dots)÷2.

In step S1 of generating halftone image data Ha having contact points 3 of dots 1, image data G having uniform pixel values corresponding to the size of the threshold array 36 is supplied from the threshold array corrector 22 to the comparator 32 and the address calculator 34.

Figure 3:
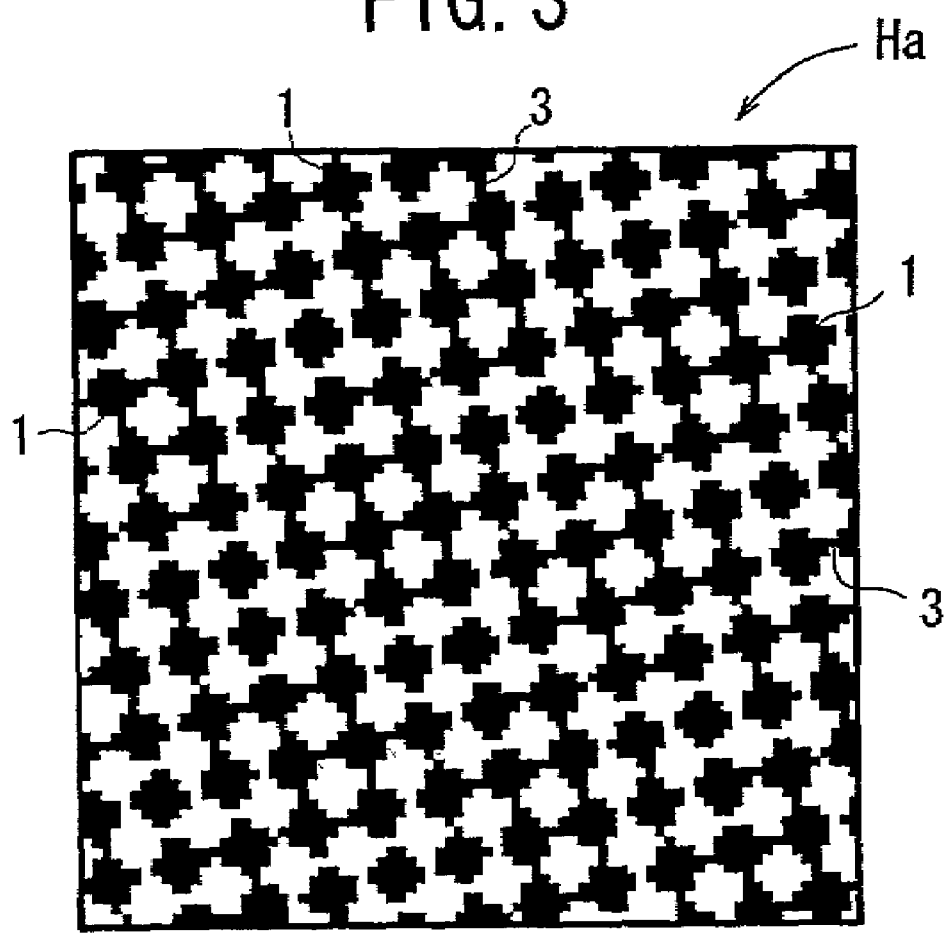
FIG. 3 is a diagram showing a dot pattern in a position space which is represented by halftone image data.

The comparator 32 compares the image data G having uniform pixel values and the thresholds T of the threshold array 36 with each other, as described above, and generates halftone image data (dot pattern) Ha having contact points 3 of dots 1 as shown in FIG. 3, for example.

Figure 4:
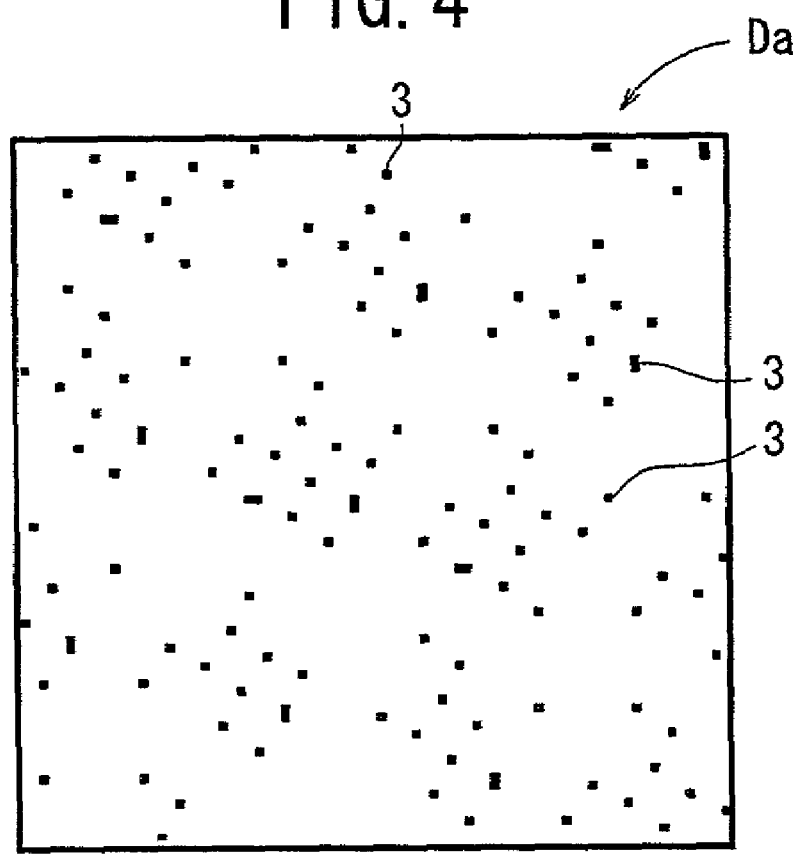
FIG. 4 is a diagram showing contact points of dots with respect to the dot pattern shown in FIG. 3.

In step S2, contact point distribution data Da made up of pixels of only contact points 3 of dots 1 as shown in FIG. 4 is extracted from the halftone image data Ha shown in FIG. 4.

A process of determining whether a pixel of interest or an attentional pixel is a contact point 3 (which may be referred to as a non-contact point candidate 3 because it is a pixel that is to be a non-contact point) in extracting the contact point distribution data Da will be described below.

Figure 5:
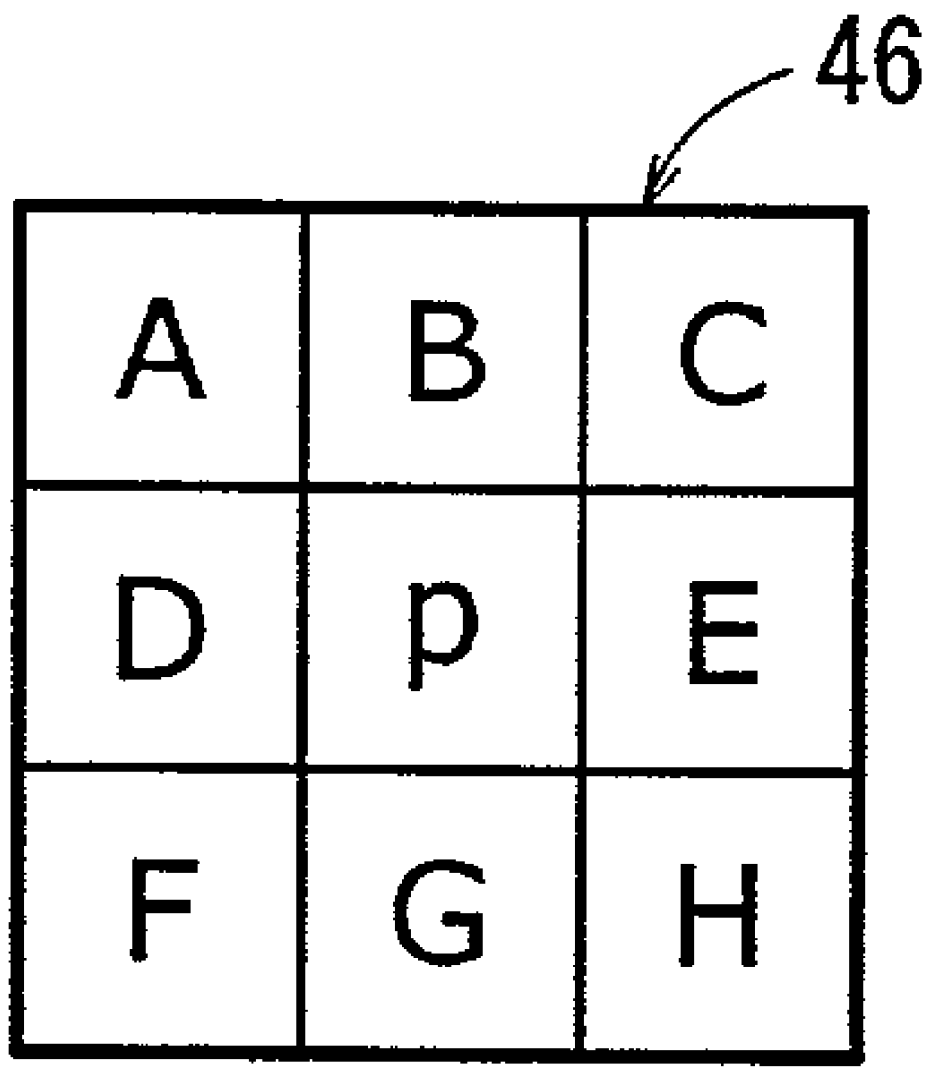
FIG. 5 is a diagram illustrative of an algorithm for extracting a contact point of a dot (non-contact point candidate)

FIG. 5 shows an area 46 made up of 3 pixels ×3 pixels including an attentional pixel p at the center. In the area 46, if the attentional pixel p is a blackening pixel, left and right pixels D, E are blackening pixels, and upper and lower pixels B, G are whitening pixels, then the attentional pixel p is determined as a contact point (non-contact point candidate) 3.

In FIG. 5, contact points obliquely held in contact with pixels are excluded from consideration for an easier understanding. However, contact points may be detected with greater accuracy by taking oblique pixels into account according to the same process as described above.

Then, a low-frequency component is extracted from the contact point distribution data Da shown in FIG. 4 in step S3 (steps S3-1 through S3-4).

As can be seen from FIG. 4, the contact point distribution data Da is image data in a position space (real space). The image data in the position space refers to data in a coordinate system defined on an xy plane.

In step S3-1, the contact point distribution data Da is subjected to a two-dimensional fast Fourier transformation (FFT), which converts the contact point distribution data Da into data in a frequency space (a power spectrum distribution in a frequency space).

Figure 6:
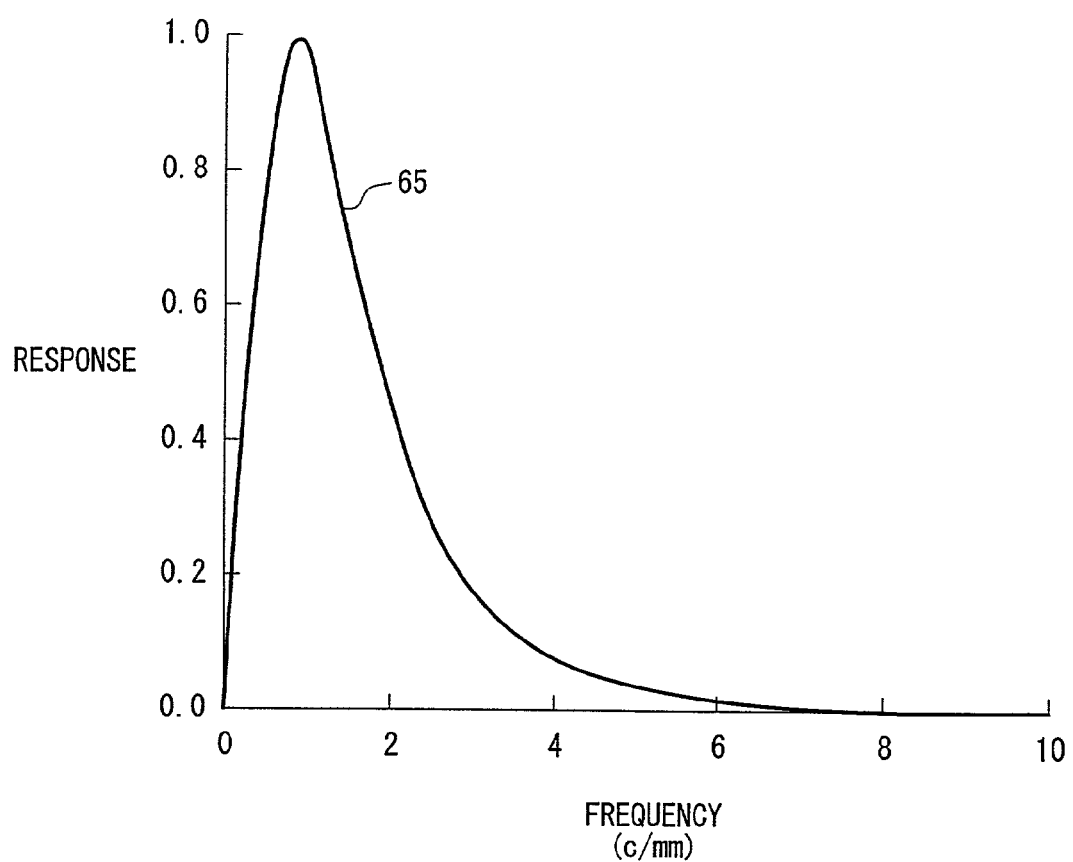
FIG. 6 is a diagram showing human visual characteristics.

In step S3-2, the data in the frequency space is subjected to a visual filtering process which is a weighting process based on human visual characteristics 65 shown in FIG. 6. In FIG. 6, characteristics having a maximum sensitivity in the vicinity of a frequency of 0.8 (c/mm) are used as the human visual characteristics 65.

In step S3-3, the data in the frequency space is processed by a low-pass filter (LPF) whose cut-off frequency is represented by the screen ruling, whereupon a low-frequency component is extracted from the data in the frequency space.

In step S3-4, the extracted low-frequency component in the frequency space is subjected to an inverse fast Fourier transformation (IFFT), which converts the low-frequency component into a low-frequency component in the position space.

The process of extracting a low-frequency component in steps S3-1 through S3-4 is disclosed in the first technique described above, for example.

In step S4, the low-frequency component in the position space is subjected to FFT and divided into particular frequency components.

In step S5, the intensities of the particular frequency components are compared with each other, and the particular frequency components are rearranged in order of intensity.

In step S6, the particular frequency component having the strongest intensity, i.e., the first strongest intensity, is subjected to IFFT, and converted into an intensity distribution in the position space.

In step S6, actually, the particular frequency component having the highest intensity, i.e., the maximum intensity, of the intensities of the particular frequency components that are left at present is subjected to IFFT, thus determining an intensity distribution in the position space.

In step S7, the intensity distribution in the position space and the contact point distribution data Da of the contact point (non-contact point candidate) 3 shown in FIG. 4 are compared with each other, calculating the intensity at the position of each contact point (non-contact point candidate) 3.

In step S8, the position of the contact point (non-contact point candidate) 3 having the maximum intensity of the intensities of contact points (non-contact point candidates) 3 is determined as a non-contact point candidate position that is to be a non-contact point.

In step S9, it is determined whether there is one non-contact point candidate position or not. Usually, since the intensity distribution of the particular frequencies in the position space in step S8 is of a sinusoidal periodic nature, a plurality of non-contact point candidate positions are determined.

Then, the particular frequency component having the next strongest intensity, i.e., the second strongest intensity, determined in step S4 is subjected to IFFT in step S6.

In step S7, the intensity distribution in the position space of the particular frequency component having the second strongest intensity and the non-contact point candidate positions selected and determined in step S8 in the preceding cycle are compared with each other, calculating the intensity at each non-contact point candidate position.

In step S8, the position of the non-contact point candidate having the maximum intensity of the intensities of the non-contact point candidates is determined as a non-contact point candidate position that is to be a non-contact point.

In step S9, it is again determined whether there is one non-contact point candidate position or not.

If the non-contact point candidate positions cannot be narrowed down to one non-contact point candidate position, then the process in steps S6 through S8 is repeated by subjecting the particular frequency component having the third strongest intensity to IFFT in step S6 until the condition of step S9 is satisfied.

If the condition of step S9 is satisfied, i.e., if there is one non-contact point candidate position, then control goes to a process of determining a contact point candidate position in steps S50, S100.

If the condition of step S9 is satisfied, a contact point 3 corresponding to one selected non-contact point candidate position in the contact point distribution data Da shown in FIG. 4 is a blackening pixel corresponding to a pixel that is whitening.

In step S50, contact point candidate distribution data Db is generated.

According to the contact point candidate distribution data Db, with respect to the area 46 made up of 3 pixels×3 pixels for the halftone image data Ha having contact points 3 of dots 1 as shown in FIG. 3, if the attentional pixel p is a whitening pixel, left and right pixels D, E are blackening pixels, and upper and lower pixels B, G are whitening pixels, then the attentional pixel p is determined as a contact point candidate.

If the attentional pixel p is a whitening pixel, upper and lower pixels B, G are blackening pixels, and left and right pixels D, E are whitening pixels, then the attentional pixel p is determined as a contact point candidate.

Alternatively, a contact point candidate may be a blackening pixel in a peripheral region of a dot 1 or a blackening pixel in a peripheral region of a dot if the halftone % is limited to a range from 50% to 60%.

At any rate, it is preferable to apply the contact point candidate distribution data Db to a dot pattern where the number of pixels of the contact point 3 of the contact point distribution data Da and the number of pixels of the contact point 3 of the contact point candidate distribution data Db are equal to each other.

Then, a process of selecting and determining a contact point candidate position that is to be a contact point 3 (blackening pixel) of a dot 1 is effected on the contact point candidate distribution data Db.

In the process in steps S3 through S9, a contact point excluding pixel position of a dot for changing a single blackening pixel to a whitening pixel is determined. In step S100, a process of determining a contact point candidate position of a dot for changing a single whitening pixel to a blackening pixel is carried out.

Figure 7:
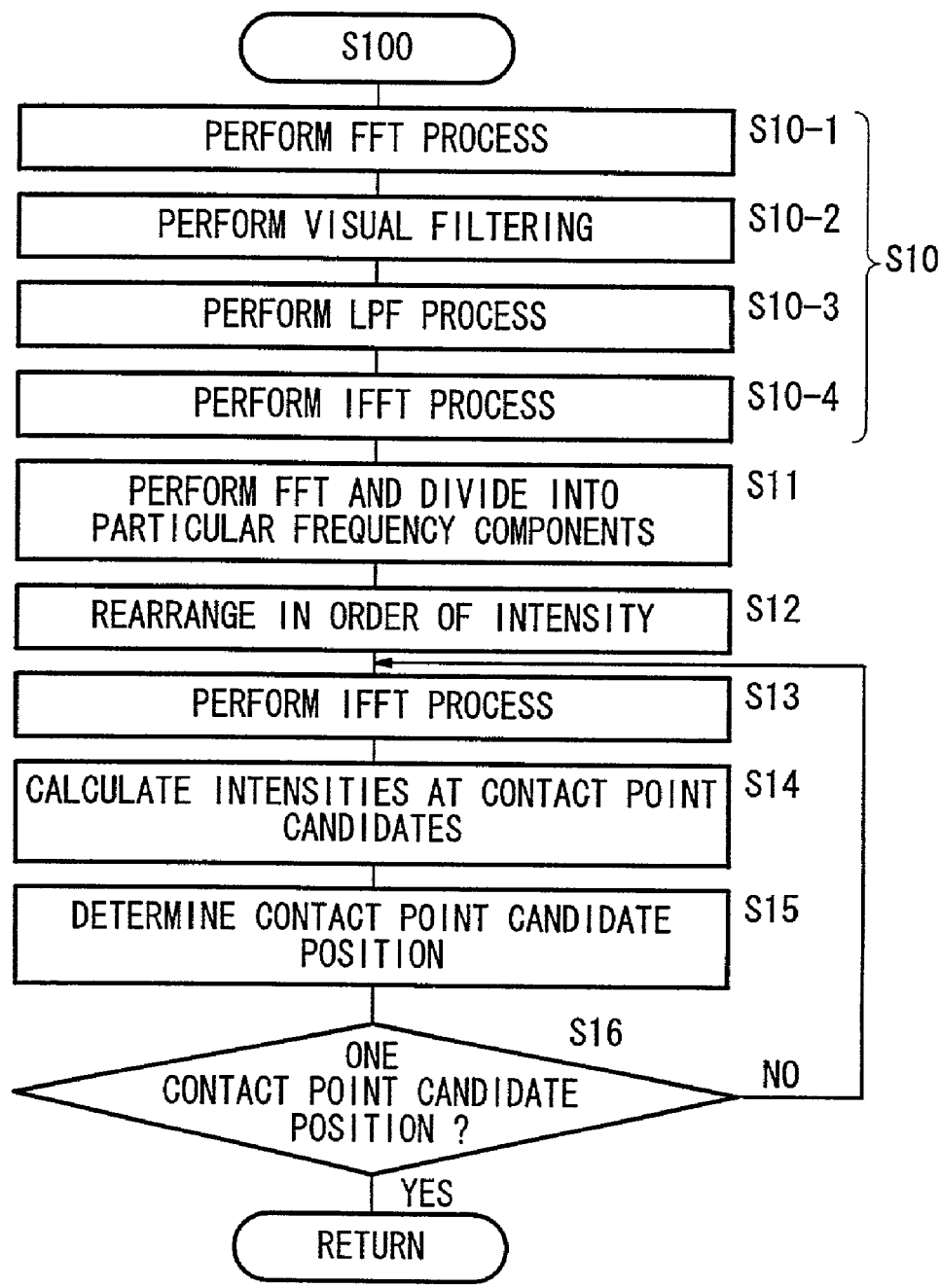
FIG. 7 is a flowchart of a process of determining a contact point candidate position.

FIG. 7 shows a detailed process carried out in step S100. In step S100, steps S10 (S10-1, S10-2, S10-3, S10-4) through S15 correspond to steps S3 (S3-1, S3-2, S3-3, S3-4) through S9 described above, and will only briefly be described below.

In step S10 (S10-1, S10-2, S10-3, S10-4), a low-frequency component in a position space is extracted from the contact point candidate distribution data Db.

In step S11, the extracted low-frequency component is divided into particular frequency components by FFT.

In step S12, particular frequency components are rearranged in order of intensity.

In step S13, the particular frequency component having the strongest intensity, i.e., the maximum intensity, among the remaining frequency components which have not yet been subjected to IFFT at present is subjected to IFFT, and converted into an intensity distribution in the position space.

In step S14, as with step S7, the intensity distribution in the position space and the contact point candidate distribution data Db are compared with each other, calculating the intensity of each contact point candidate.

In step S15, the position of a contact point candidate having the smallest intensity among the intensities of the contact point candidates is determined as a contact point candidate position that it to be a contact point. The process in step S15 differs from the process in step S8 in that the position of a contact point candidate having the smallest intensity, not the greatest intensity, is selected to be a contact point candidate position.

In step S16, it is determined whether there is one non-contact point candidate position or not. Usually, since the intensity distribution of the particular frequencies in the position space is of a sinusoidal periodic nature, a plurality of non-contact point candidate positions are determined in step S15.

Then, the particular frequency component having the next strongest intensity, i.e., the second strongest intensity, determined in step S11 is subjected to IFFT in step S13.

If the non-contact point candidate positions cannot be narrowed down to one non-contact point candidate position in step S16, then the process in steps S13 through S15 is repeated until the condition of step S16 is satisfied.

If the condition of step S16 is satisfied, i.e., if there is one non-contact point candidate position in step S16, then control goes to step S20 shown in FIG. 2.

If the condition of step S16 is satisfied, one selected contact point candidate position in the contact point candidate distribution data Db is a whitening pixel corresponding to a pixel that is blackening.

In step S20, the threshold for the contact position (non-contact point candidate position) selected and determined in step S9 and the threshold for the contact point candidate position selected and determined in step S16 are switched around, thus correcting the present threshold array 36.

According to the halftone image data H generated by the corrected threshold array 36, the position of the contact point 3 of the dot 1 is corrected.

Then, in order to confirm the correction of position of the contact point 3 of the dot 1, the image data G having uniform pixel values which has been supplied to the comparator 32 and the address calculator 34 in step S1 is supplied to the comparator 32 and the address calculator 34 in step S21.

The comparator 32 then compares the image data G having uniform pixel values and the thresholds T of the corrected threshold array 36 with each other, generating halftone image data Hc similar to the halftone image data (dot pattern) Ha having the contact points 3 of the dots 1 shown in FIG. 3. In step S22, contact point distribution data Dc is generated in the same manner as with step S2 for the evaluation of a single-plate moiré.

In step S23, the contact point distribution data Dc is visually observed to evaluate and confirm whether a single-plate moiré has occurred or not. Rather than visually observing the contact point distribution data Dc, the intensity distributions in the position space after the low-frequency component has been extracted in step S3 before and after the threshold array 36 is corrected may be compared with each other to evaluate and confirm whether a single-plate moiré has occurred or not.

If the evaluation is not preferable, i.e., if a single-plate moiré has occurred, then the process in steps S1 through S22 is repeated until the evaluation in step S23 becomes favorite.

Figure 8:
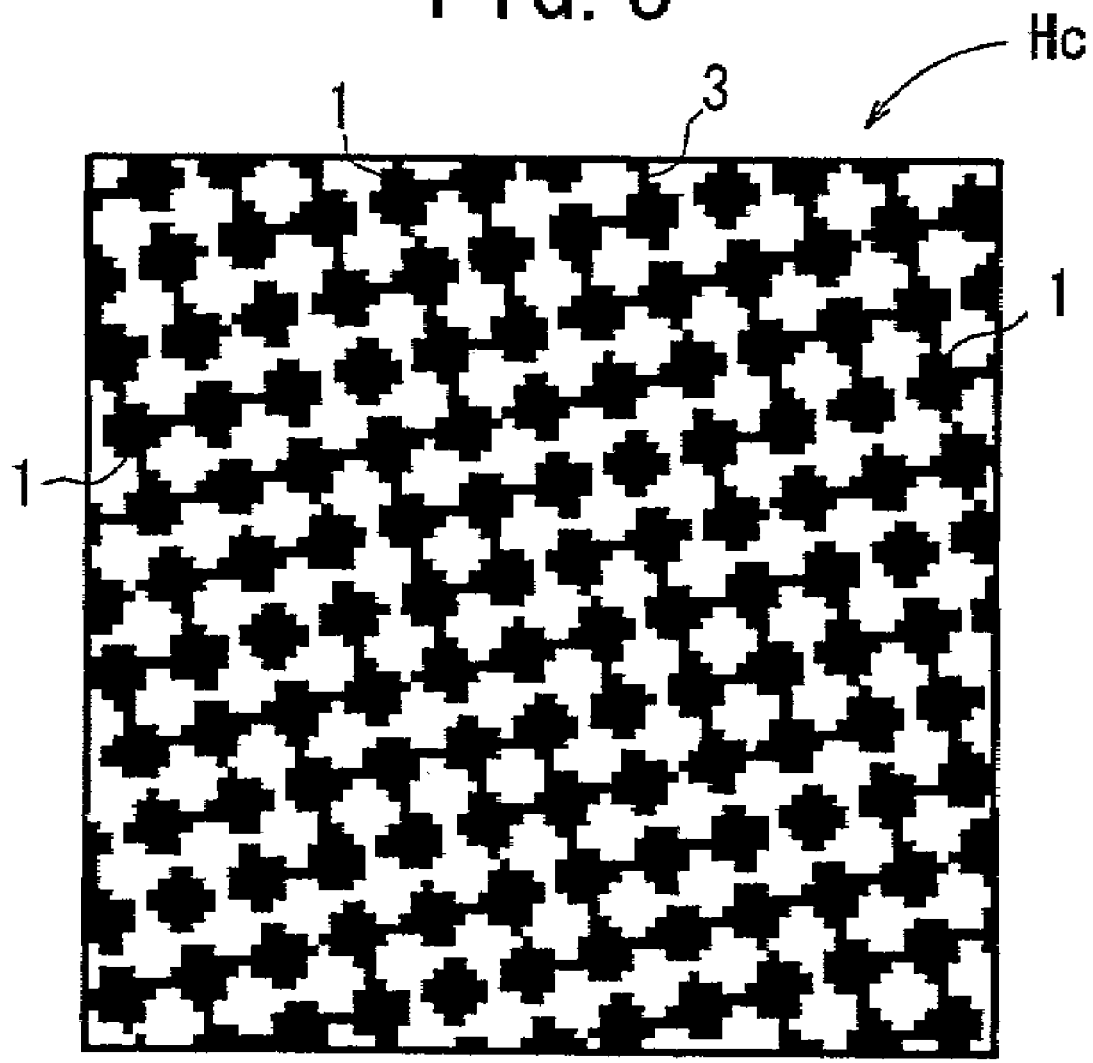
FIG. 8 is a diagram showing a dot pattern in a position space after contact points of dots are rearranged in position.

FIG. 8 shows the halftone image data (dot pattern) Hc produced after the threshold array is corrected, which corresponds to the halftone image data (dot pattern) Ha having the contact points 3 of the dots 1 shown in FIG. 3 in case the evaluation in step S23 becomes favorite.

Figure 9:
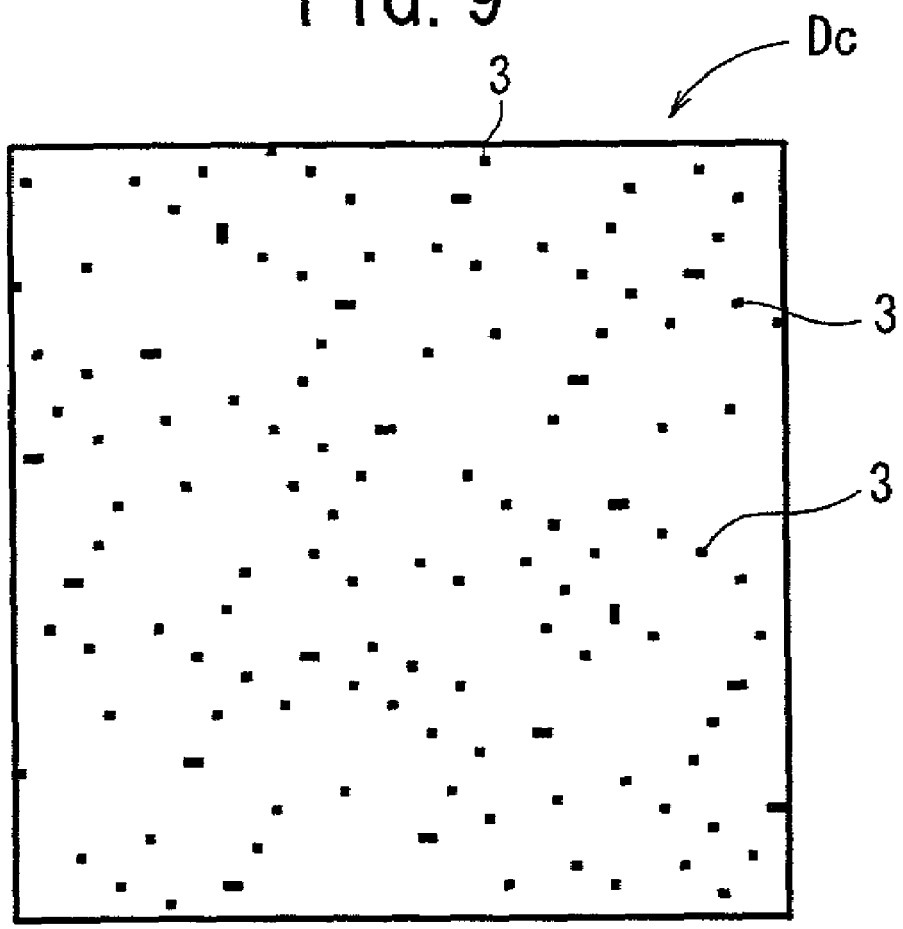
FIG. 9 is a diagram showing contact points of dots with respect to the dot pattern shown in FIG. 8.

FIG. 9 shows the contact point distribution data Dc made up of the contact points 3 of the dots 1 extracted from the halftone image data Hc shown in FIG. 8 according to the algorithm shown in FIG. 5.

It will be understood that the corrected contact point distribution data Dc generated by the corrected threshold array 36 contains no or less periodicity representative of a single-plate moiré than the contact point distribution data Da shown in FIG. 4.

According to the above embodiment, as described above, for correcting the threshold array 36 of thresholds T for reproducing a gradation with a dot pattern which is a clustered pattern of dots 1 each made up of one or more blackening pixels, the position of contact points 3 of dots 1 is corrected by a process (step (A)) in steps S2 through S9 for determining a single non-contact point candidate position that is to be a non-contact point among the contact points 3 of the dots 1 at a certain gradation (e.g., halftone image data Ha where about half of the contact points 3 of the dots 1 are held in contact with other contact points), a process (step (B)) in step S100 for determining a single contact point candidate position that is to be a contact point 3 among non-contact points of the dots 1 at the certain gradation, and a process in step S20 for switching around the threshold T for the non-contact point candidate position selected in steps S2 through S9, and the threshold T for the contact point candidate position selected in the process in step S100.

By thus generating the threshold array 36 with the thresholds T switched around, fringes generated due to the interference between the output resolution and the screen ruling in the vicinity of contact points of dots, i.e., a single-plate moiré, can be eliminated or reduced.

The process in steps S2 through S9 and the process in step S100 are carried out a plurality of times, i.e., a plurality of non-contact point candidate positions and a plurality of contact point candidate positions are selected and determined, thereby eliminating or reducing a single-plate moiré more effectively.

The threshold array 36 thus determined may be recorded in the storage medium 49 such as an optical disk or the like, and supplied to the market.

Similarly, when new parameters (a screen ruling, a screen angle, an output resolution, a screen shape, etc.) are set by the screen attribute input unit 38, a corrected threshold array 36 corresponding to those new parameters can be determined substantially automatically.

For printing a color image, it is necessary to produce the plates of four colors, i.e., C (cyan), M (magenta), Y (yellow), and K (black). Therefore, the threshold arrays 36 for the plates of four colors at different angles (usually 0° (e.g., Y), 15° (e.g., C), 45° (e.g., M), and 75° (e.g., K) are generated according to the above algorithm.

Attention is paid to only contact point positions in the process of calculating intensities at non-contact point candidate positions in step S7 and the process of calculating intensities at contact point candidate positions in step S14. However, low-frequency components of the entire dot pattern may be taken into account in the process of switching around the threshold positions in step S20.

Specifically, while attention is given to only a distribution of contact points 3 (FIG. 4) for calculating non-contact point candidate positions and contact point candidate positions in the above system, better results will be obtained by taking a distribution (FIG. 3) in the entire dot pattern into account. Specifically, low-frequency components of the distribution of contact points 3 and low-frequency components with respect to the entire dot pattern according to the first technique described above are calculated with respect to each candidate position, and taken into account in determining a candidate position. With this arrangement, the contact point distribution is improved, and the dot pattern is not impaired.

The algorithm based on the flowchart shown in FIG. 2 may be applied recurrently in a halftone % range where the contact points 3 of the dots 1 are present. For example, when the algorithm is applied to halftone % successively in the order from 50% to 48% to 52% to 49% to 51% to 48.5%, it is possible to obtain a threshold array 36 with corrected threshold positions which is capable of eliminating or reducing a single-plate moiré in the vicinity of 50%.

In determining a non-contact point candidate, it is preferable not to select candidate pixels which tend to distort a dot shape so largely that pixels on four sides of blackening pixels are whitening pixels, i.e., isolated pixels. The same holds true for determining contact point candidates.

In the above embodiment, the binary halftone image data H are processed. However, the principles of the present invention are not limited to the binary halftone image data H, but are also applicable to multi-valued halftone image data such as four-valued halftone image data having output values "0, 1, 2, 3", eight-valued halftone image data, etc.

The platemaking system 10 shown in FIG. 1 where the threshold array 36 thus generated is set is capable of producing a film F carrying an image as a dot pattern substantially free of a single-plate moiré even under the output conditions where it has heretofore been difficult to produce a film due to a single-plate moiré, e.g., the resolution is 1200 pixels per inch and the screen ruling is 175 lines per inch, or generally, under the output condition where the ratio of the output resolution to the screen ruling is 10 or smaller.

In the above embodiment, a process of determining the positions of thresholds in a method of reproducing a gradation image using a threshold array 36 has been described above. The present invention serves to determine which threshold array 36 is an optimum arrangement in a gradation in the vicinity of a contact point of a dot. As can easily be understood by those skilled in the art, a threshold array 36 which is determined as described above is applicable to another gradation reproducing technique such as a density pattern method in which one pixel of a gray-scale image is associated with a submatrix of Z×Z dots and the density of each pixel is reproduced by the area ratio of blackening dots in the submatrix.

In the above embodiment, dots according to an AM screen, in which dots having substantially uniform sizes are arranged at substantially equal intervals in rows and columns perpendicular thereto, representing the gray scale with the sizes of dots 1 have been described. The present invention is also applicable to the reduction of a low-frequency component generated in relation to a threshold array in a gradation reproducing process based on an array of other than dots, e.g., an FM screen in which dots are irregularly arranged and the gray scale is represented by the density of dots.

If an FM screen is employed, then a filter according to only the human visual characteristics may be used in the low-pass filtering process, and any filtering according to a low-pass filter corresponding to the screen ruling at the dot period is not required.

According to the present invention, as described above, it is possible to eliminate or reduce fringes generated due to the interference between the output resolution and the screen ruling because of the layout of contact points of dots, i.e., a single-plate moiré.

An apparatus for correcting a halftone image data layout, which doubles as an apparatus for generating a threshold array for generating a gradation image, which carry out a method of correcting a pixel layout of an image and a method of determining a threshold array for generating an image according to another embodiment of the present invention will be described below.

Figure 10:
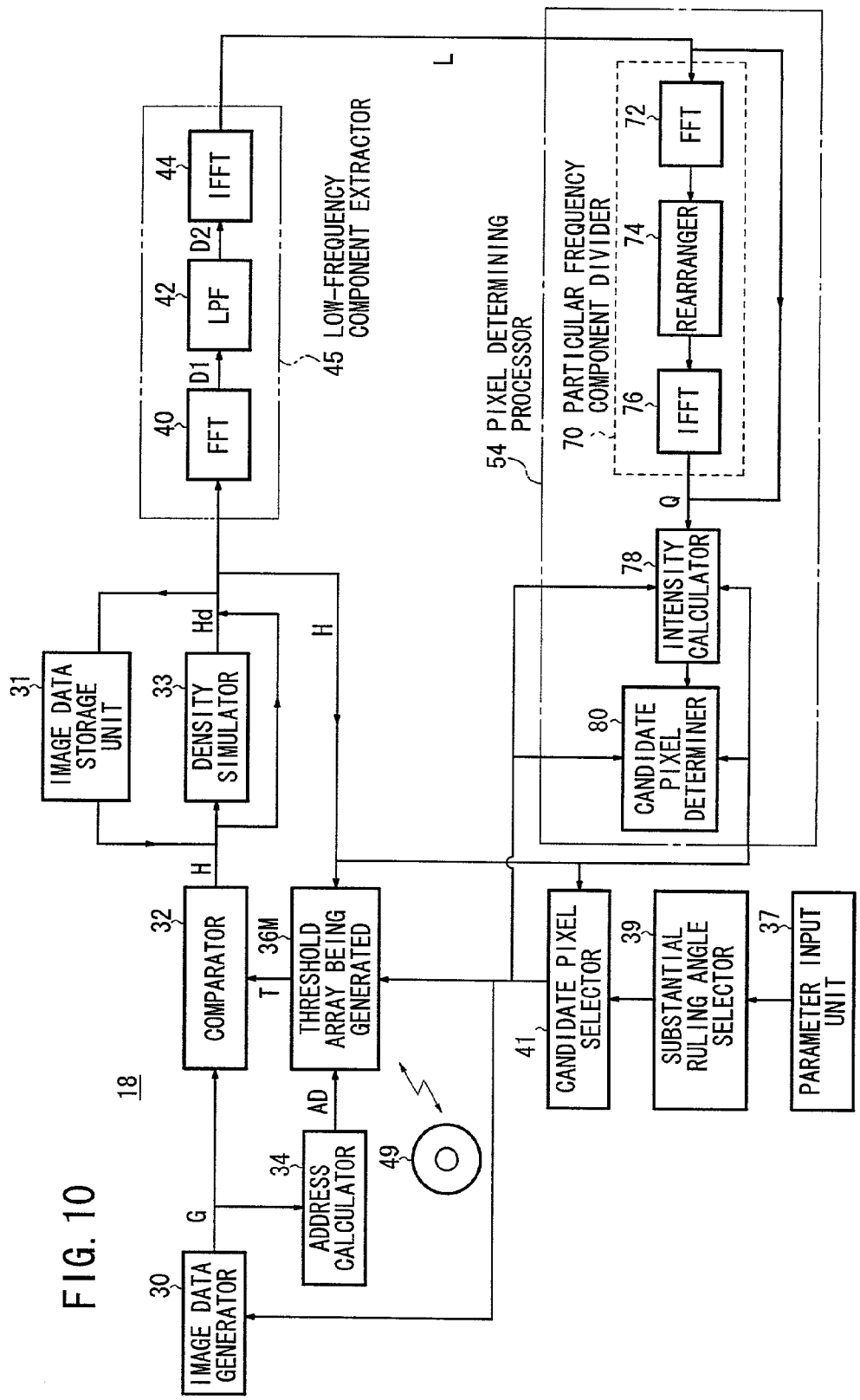
FIG. 10 is a block diagram of an apparatus for correcting a halftone image data layout, which doubles as an apparatus for generating a threshold array.

FIG. 10 shows an apparatus (apparatus for generating a threshold array for generating a gradation image) 18 for generating a threshold array 36 composed of a plurality of thresholds T (1, 2, . . . , 255), the apparatus 18 comprising a storage medium such as a RAM (Random Access Memory), a hard disk, or the like which serves as a memory means. The gradation image referred to above is a multi-valued image such as a binary image (a gradation image composed of blackening pixels and whitening (non-blackening) pixels) or a four-valued image (e.g., a gradation image made up of gradations represented by four densities 0, 1, 2, 3).

Those part of the threshold array generating apparatus 18 which are identical to those of the platemaking system 10 shown in FIG. 1 are denoted by identical reference characters, and will not be described in detail below.

The threshold array generating apparatus 18 has a parameter input unit 37 for setting input parameters including a screen ruling, a screen angle, an output resolution, a screen shape, etc., a substantial ruling angle selector 39 for selecting a substantial ruling and angle depending on the set input parameters, and a candidate pixel selector 41 for selecting blackening candidates or whitening candidates depending on the selected substantial ruling and angle. When thresholds of the threshold array 36 are determined, the candidate pixel selector 41 functions as a blackening candidate pixel selector for selecting blackening candidate pixels if a threshold of a higher next gradation is determined, and as a whitening candidate pixel selector for selecting whitening candidate pixels if a threshold of a lower next gradation is determined.

The threshold array generating apparatus 18 also has an image data generator 30 for generating image data G having a constant size in terms of a threshold size to generate an image pattern according to a determined threshold array depending on candidate pixels selected by the candidate pixel selector 41, an address calculator 34 for calculating an address AD based on the image data G generated by the image data generator 30, and supplying the generated address AD to the threshold array 36 which is being generated, a threshold array 36M which is being generated that stores (saves) thresholds successively determined from an initial state where all thresholds T are zero and hence essentially are not provided, a comparator 32 for generating halftone image data H having a value 0 or a value 1 from the thresholds T being generated (thresholds T already determined) and the image data G, and a density simulator 33 generating density image data Hd (binary data of "0" and "1") corresponding to a density image (also referred to as gray-scale image) outputted from the image output apparatus 24 shown in FIG. 1 based on the halftone image data H.

An image data storage unit 31 is connected between input and output terminals of the density simulator 33, for storing and outputting halftone image data H before its pixel layout is corrected and storing halftone image data H after its pixel layout is corrected and density image data Hd. The halftone image data H is also referred to by the candidate pixel selector 41, a candidate pixel determiner 80, and an intensity calculator 78.

The threshold array generating apparatus 18 further includes a low-frequency component extractor 45 for extracting low-frequency component data (a low-frequency noise component, low-frequency noise data, or a low-frequency component) L from the halftone image data H or the density image data Hd, and a pixel determining processor 54 for calculating the intensity of a particular frequency component at the position of a candidate pixel selected by the candidate pixel selector 41 and determining a next pixel position as a position where a threshold is to be provided based on the calculated intensity of the particular frequency component.

The low-frequency component extractor 45 comprises a fast Fourier transformer (FFT) 40 as a frequency converting means, a low-pass filter (LPF) 42, and an inverse FFT (IFFT) 44 as an inverse frequency converting means. The frequency converting means is not limited to the Fourier transformer 40, but may comprise a weblet converting means. If the frequency converting means comprises a weblet converting means, then the inverse frequency converting means comprises an inverse weblet converting means.

The low-frequency component extractor 45 may be arranged to extract a low-frequency component by way of filtering (convoluting operation) in a real space without the need for a frequency converting means. Depending on the mask size of the convoluting operation or the image data size, the time required to extract a low-frequency component may often be shorter using a frequency converting means than using the convoluting operation.

The halftone image data H generated by the comparator 32 or the halftone image data H outputted from the image data storage unit 31 is supplied to the FFT 40 either through the density simulator 33 or directly. Whether the halftone image data H is to be supplied to the FFT 40 either through the density simulator 33 or directly may be determined by a selecting means, not shown.

The halftone image data H is image data in the position space (real space). The data in the position space refers to data in a coordinate system on an xy plane. The halftone image data H in the position space is converted by the FFT 40 into data D1 as an information signal in a frequency space, which is supplied to the LPF 42 whose cut-off frequency is set to a basic frequency component of halftone dots (screen ruling component). The data in the frequency space refers to data in a coordinate system defined in a frequency space having x- and y-axes as frequency axes.

The LPF 42 extracts data D2 containing low-frequency components lower in frequency than the basic frequency component of halftone dots (screen ruling component) from the data D1 in the frequency space, and supplies the extracted data D2 to the IFFT 44.

The IFFT 44 converts the data D2 containing low-frequency components extracted in the frequency space into low-frequency component data L which is image data in the position space, and supplies the low-frequency component data L to the pixel determining processor 54.

The pixel determining processor 54 comprises a particular frequency component divider 70 for analyzing the low-frequency component data L for frequencies and dividing and extracting a plurality of particular frequency component data Q, an intensity calculator 78 for calculating the intensities of the extracted particular frequency component data Q at respective candidate pixel positions, and a candidate pixel determiner 80 for determining blackening pixels and whitening pixels among blackening candidate pixels and whitening candidate pixels based on the calculated intensities. The particular frequency component divider 70 comprises an FFT 72 which is functionally identical to the FFT 40, a rearranger 74, and an IFFT 74 which is functionally identical to the IFFT 44.

The pixel determining processor 54 can determine candidate pixels from either the particular frequency component data Q outputted from the particular frequency component divider 70 or the low-frequency component data L. Whether the particular frequency component data Q or the low-frequency component data L is to be used may be determined by a selecting means, not shown.

A threshold array determined by the pixel determining processor 54 based on the low-frequency component data L or the particular frequency component data Q is supplied to the threshold array 36M which is being generated. When all thresholds ranging from 1 to 255 are determined and stored, the threshold array 36M which is being generated is regarded as a threshold array 36 whose thresholds have all been determined and then is stored in the storage medium 49. The stored threshold array 36 is copied from the storage medium 49 to the threshold array 36 in the platemaking system 10 shown in FIG. 1 for use therein.

As described above, the pixel determining processor 54 determines replacement pixels from blackening pixels to whitening pixels or replacement pixels from whitening pixels to blackening pixels.

Figure 11:
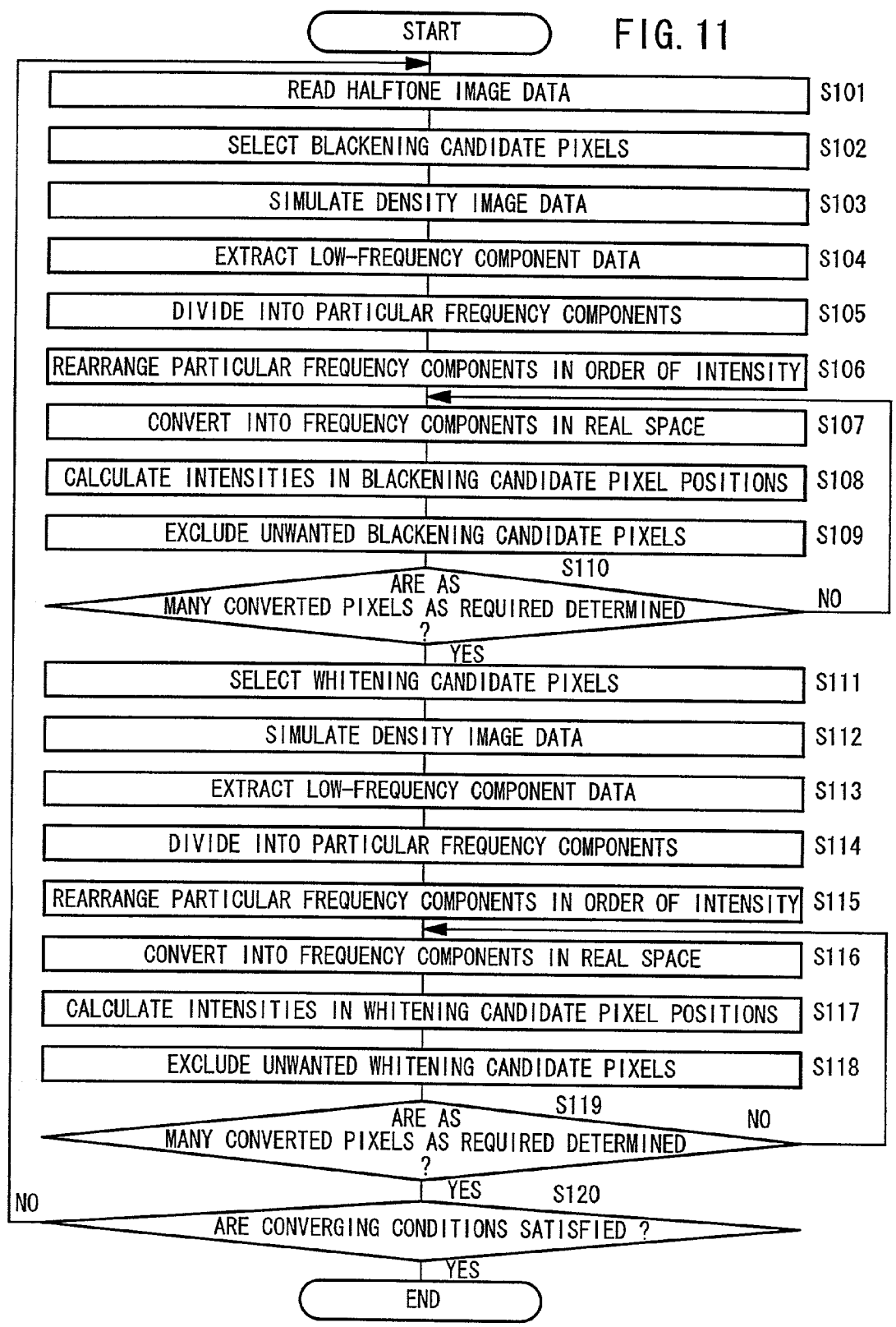
FIG. 11 is a flowchart of a process of correcting a halftone image data layout.

A process for correcting the layout of pixels of halftone image data with the threshold array generating apparatus 18 will be described below with reference to FIG. 11.

In step S101, halftone image data H at a certain gradation whose pixel layout is to be corrected to suppress the generation of a single-plate moiré is read from the image data storage unit 31 and supplied to the candidate pixel selector 41.

Figure 12:
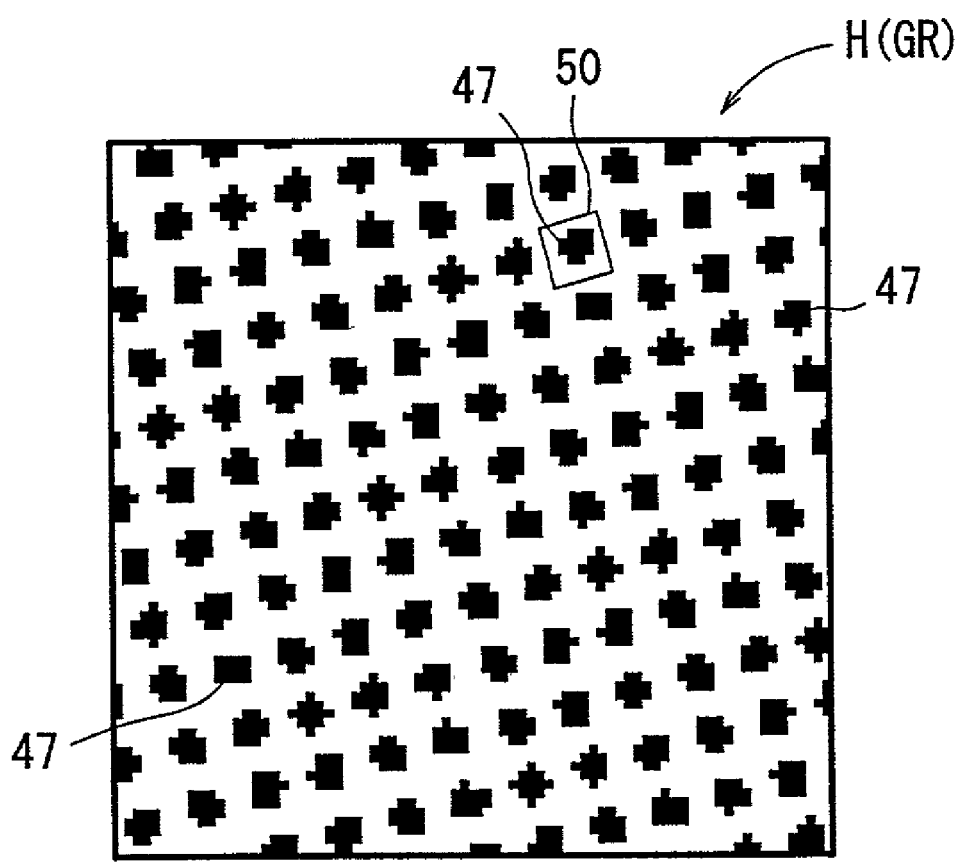
FIG. 12 is a diagram showing an image in a position space which is represented by halftone image data.

FIG. 12 shows halftone image data (halftone image) H of a certain gradation which is formed of a clustered pattern of dot cells 50 having dots 47 each made up of one or more blackening pixels. The halftone image data H shown in FIG. 12 represents one supercell and is made up of a plurality of dot cells 50. The dot 47 in the dot cell indicated by the reference numeral 50 is made up of 13 blackening pixels. The dot 47 in another dot cell which is not indicated by the reference numeral 50 may be made up of 12 blackening pixels.

The halftone image data H represents a screen tint (a dot pattern of a uniform density which is composed of dots arranged at a certain ratio) having such attributes as a halftone % of about 23% at a certain gradation GR, a screen ruling of 175 lpi=6.89 lines/mm, a screen angle of 15 degrees, an output resolution of 1200 dpi=47 dots/mm (pixels/mm) (one pixel has a square size having sides each about 21 μm long), and a square screen shape. The screen shape may be a circular or any other geometrical shape other than the square shape. The total number of pixels including whitening pixels and blackening pixels within one dot cell 50 is 47$\{=(1200/175)^2\}$.

The halftone image data H shown in FIG. 12 comprises a screen tint (a dot pattern of uniform density which is composed of dots arranged at a constant ratio).

It can be seen from FIG. 12 that the halftone image data H represents data in a coordinate system defined on an xy plane, i.e., data where data in a position space (which may be considered as being z-axis data) has a value 0 (non-blackening or whitening) or a value 1 (blackening).

In step S102, the candidate pixel selector 41 selects one or more whitening pixels among whitening pixels around blackening pixels on the outermost profile which forms the profile of each of the dots 47 that make up the halftone image data H of a gradation GR shown in FIG. 12, as blackening candidate pixels of a gradation GR(GR←GR+1) next to the certain gradation GR.

Figure 13:
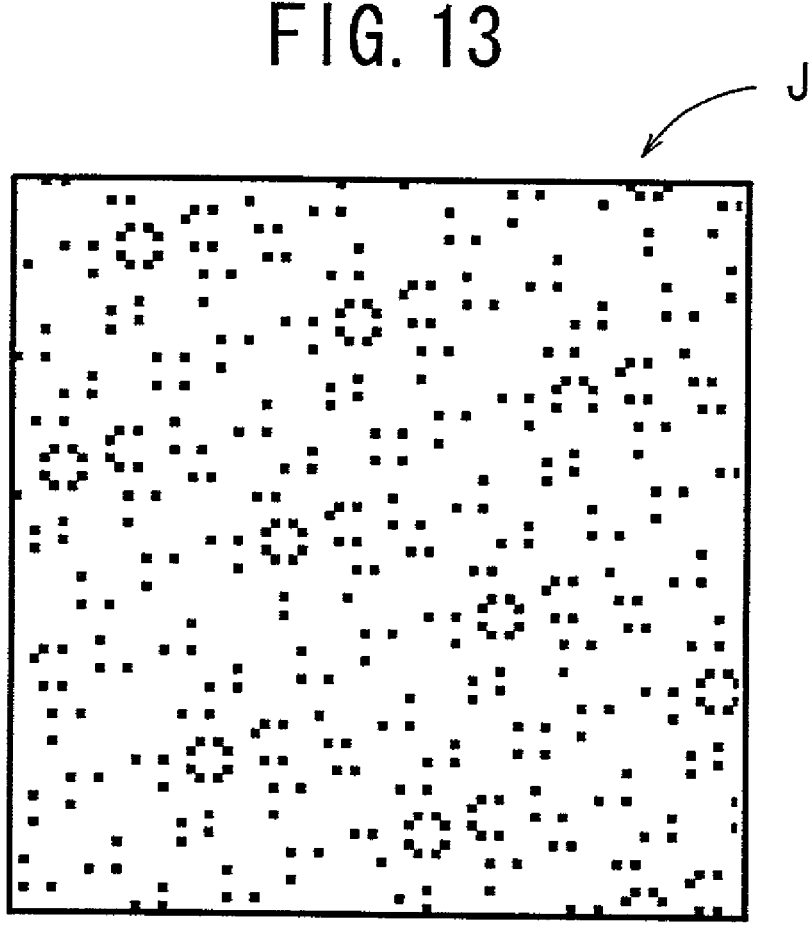
FIG. 13 is a diagram showing next blackening candidate pixels for the image shown in FIG. 12.

FIG. 13 shows an arrangement of blackening candidate pixels in a supercell based on blackening candidate pixel data J calculated from the halftone image data H shown in FIG. 12 according to the process of selecting candidate pixels in step S102.

Blackening candidate pixels are selected to satisfy the halftone dot characteristics (ruling, angle, and shape) of the halftone image data H, and selected from the pixels around the pixels which have already been blackened with the halftone image data H shown in FIG. 12. If the number of blackening candidate pixels is increased, then the degree of freedom of correcting the pixel layout (i.e., turning blackening pixels into whitening pixels and whitening pixels into blackening pixels) is increased, but the square dot shape in this example, is lost.

In step S103, the density image data Hd corresponding to a density image obtained from the halftone image data H is simulated by the density simulator 33. The density image is a gray-scale image outputted from the image output apparatus 24 supplied with the halftone image data H and formed on the film F, for example. The data representing the gray-scale image is referred to as the density image data Hd.

In FIG. 14, the left-hand side represents the halftone image data H with each pixel being of a square shape. When an image is actually outputted from the image output apparatus 24, it is rare for each pixel to be of a square shape, and each pixel can generally be approximated roughly as being of a circular shape or an elliptical shape. Such a dot thickening may be referred to as dot gain. The density image data Hd is data representing a density predicted based on the areas shown hatched on the right-hand side of FIG. 14.

The radius of a circular shape in the density image data Hd shown in FIG. 14 can be determined by actually outputting a test pattern from the image output apparatus 24 and measuring how each pixel of the original halftone image data H is outputted on the gray-scale image of the test pattern. The area ratio of the density image data Hd which is close to the actual density image can be calculated from the halftone image data H using the radius thus determined.

FIG. 14 shows how dots are thickened when the halftone image data H composed of one pixel, three pixels, and four pixels are converted into the simulated density image data Hd composed of one pixel, three pixels, and four pixels. In the example shown in FIG. 14, each pixel is approximated by a circular shape, and its density is predicted. The density image data Hd may be regarded as a convoluted image which predicts the thickening of the halftone image data H with each pixel.

The density image data Hd can be determined accurately by the method disclosed in Japanese Laid-Open Patent Publication No. 11-112814. Specifically, the amount of exposure can be integrated from the beam shape used in the image output apparatus 24, and a density image can be predicted from the gamma characteristics of the photosensitive medium used.

Figure 15C:
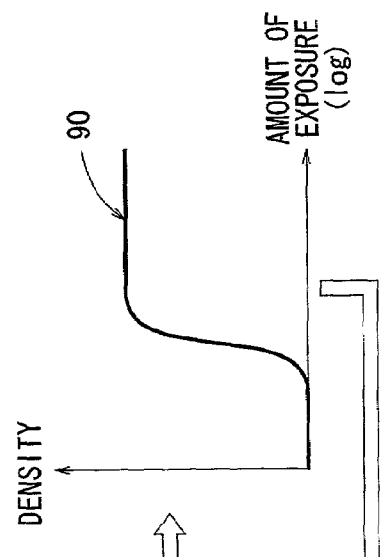
FIG. 15C is a diagram showing gamma characteristics.
Figure 15B:
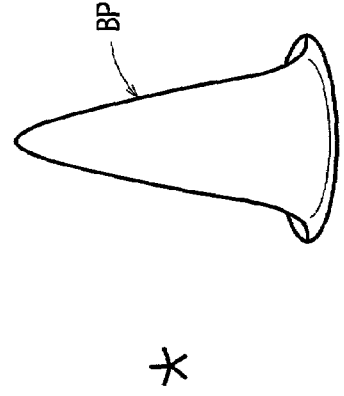
FIG. 15B is a diagram showing a shape of a laser beam.

A process of predicting a density image by way of calculations will be described in detail below. First, a simulated shape for computer calculations of a laser beam BP for forming a pixel on a recording medium such as the film F is determined. For example, a simulated shape is shown as a substantially conical laser beam BP in FIG. 15B. The laser beam BP has a shape close to the Gaussian distribution, and can substantially be expressed by a beam diameter prescribed by the maximum value $1/e^2$ of the amplitude.

Then, the laser beam BP and the halftone image data H (see FIG. 15A which is identical to FIG. 12) are subjected to convoluting calculations (the halftone image data H*BP: the notation * represents convoluting calculations) to calculate the amount of exposure for each pixel.

Then, the calculated amount of exposure for each pixel is converted into the density of each pixel by exposure characteristics 90 (see FIG. 15C) of the photosensitive medium such as the film F, i.e., the gamma characteristics thereof. From the density of each pixel thus determined, there can be obtained density image data Hd shown in FIG. 15D as representing a density simulated image.

While the image output apparatus 24 as a film setter using a photosensitive medium in a photon mode where the amount of exposure is integrated has been described above, the density image data can also be obtained on the CTP output machine 24A which uses a photosensitive medium in a thermal mode.

Figure 15A:
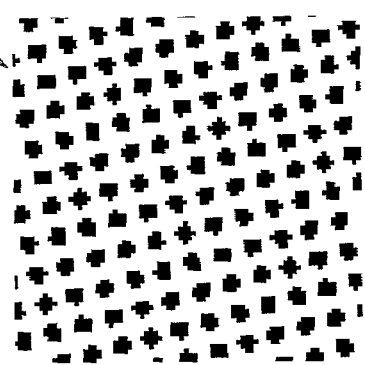
FIG. 15A is a diagram showing an image based on halftone image data.
Figure 15F:
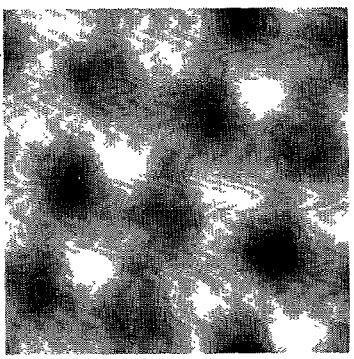
FIG. 15F is a diagram showing an image based on low-frequency components before a moiré component is suppressed.
Figure 15E:
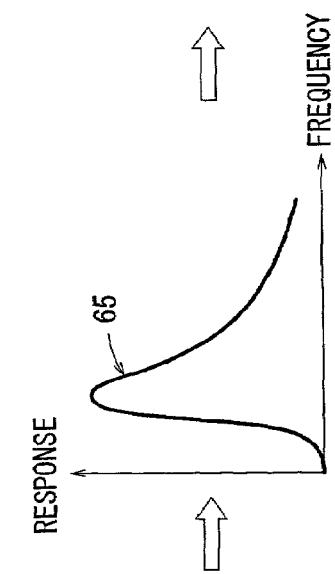
FIG. 15E is a diagram showing human visual characteristics.
Figure 15D:
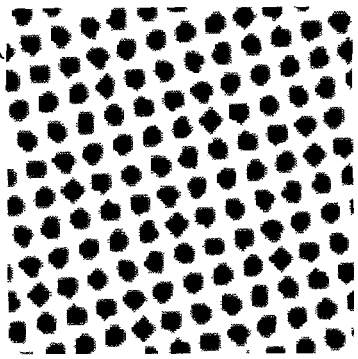
FIG. 15D is a diagram showing a density image.

The density image data Hd shown in FIG. 15D represents the density predicted when the halftone image data H made up of square pixels shown in FIG. 15A is outputted from the image output apparatus 15A.

In step S104, the low-frequency component extractor 45 extracts low-frequency component data L from the density image data Hd. While the low-frequency component data L can be extracted from the halftone image data H, the low-frequency component data L extracted from the density image data Hd whose density has been simulated by the image output apparatus 24 is more effective to remove a single-plate moiré component. In the present embodiment, therefore, it is assumed that the low-frequency component data L is extracted from the density image data Hd.

In step S104, the density image data Hd which is data in the real space is subjected to a fast Fourier transform by the two-dimensional FFT 40, and converted into data D1 which is an information signal in the frequency space.

Then, the data D1 is processed by the LPF 42 whose cut-off frequency is set to a basic frequency component of halftone dots, thus extracting data D2 containing low-frequency components.

Actually, moiré patterns are visually perceived by the human being. Therefore, when high-frequency components are removed by the LPF 42 from the data D1 which is produced by converting the density image data Hd with the FFT 40, the data D1 is weighted according to human visual characteristics 65 shown in FIG. 15E, identical to those shown in FIG. 6, and thereafter processed by the LPF 42 to extract low-frequency components.

Then, the FFT 44 inversely Fourier-transforms the low-frequency component data D2 extracted by the LPF 42, producing low-frequency component data L in the position space (real space) shown in FIG. 15F. It can be seen that a single-plate moiré pattern is generated from the low-frequency component data L. In FIG. 15F, darker regions are regions where the signal intensity is stronger than lighter regions.

The low-frequency component data L is supplied from the low-frequency component extractor 45 to the pixel determining processor 54.

In step S105, the FFT 72 of the particular frequency component divider 70 in the pixel determining processor 54 divides the low-frequency component data L into particular frequency components (basic frequency components).

Figure 16:
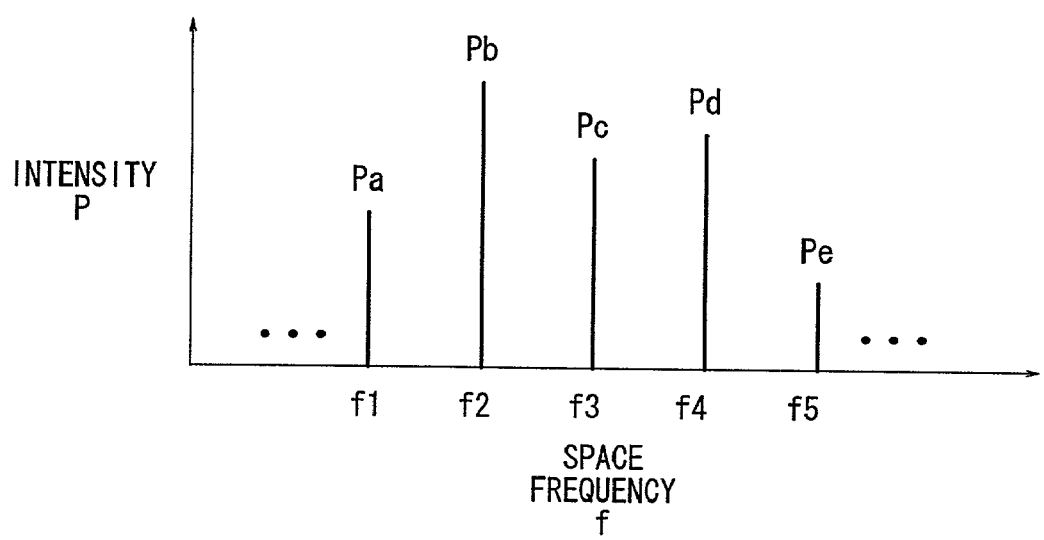
FIG. 16 is a diagram showing intensities of low-frequency components as they are subjected to a Fourier transform.

FIG. 16 shows in a one-dimensional space particular frequency components f1 (intensity Pa), f2 (intensity Pb), f3 (intensity Pc), f4 (intensity Pd), f5 (intensity Pe), ... of the space frequencies divided from the low-frequency component data L (actually, the particular frequency components occur in a two-dimensional space).

In step S106, the rearranger 74 compares the intensities of the particular frequency components and rearranges them in decreasing order (weaker order). In FIG. 16, the particular frequency components are rearranged in the order of f2 (Pb), f4 (Pd), f3 (Pc), f1 (Pa), f5 (Pe).

In step S107, the particular frequency components (basic frequency components) are converted into frequency components in the real space by the IFFT 76 in intensity reducing order.

In step S108, the intensity calculator 78 calculates the intensities of the extracted frequency components (basic frequency components) at the respective blackening candidate pixel positions.

In step S109, the pixel determiner 80 excludes blackening candidate pixels in positions which intensify the extracted frequency components from the candidates. Stated otherwise, the pixel determiner 80 leaves blackening candidate pixels whose extracted frequency components are weak in intensity.

In step S110, it is determined whether the number of remaining blackening candidate pixels, i.e., the number of pixels for converting whitening pixels into blackening pixels, is equal to a predetermined number (here, the number of blackening pixels per gradation of the supercell, Ndot) or not. The process ranging from step S107 to step S109 is repeated until the condition of step S110 is satisfied.

A procedure in steps S107 through S110 will be described in specific detail below.

Figure 17A:
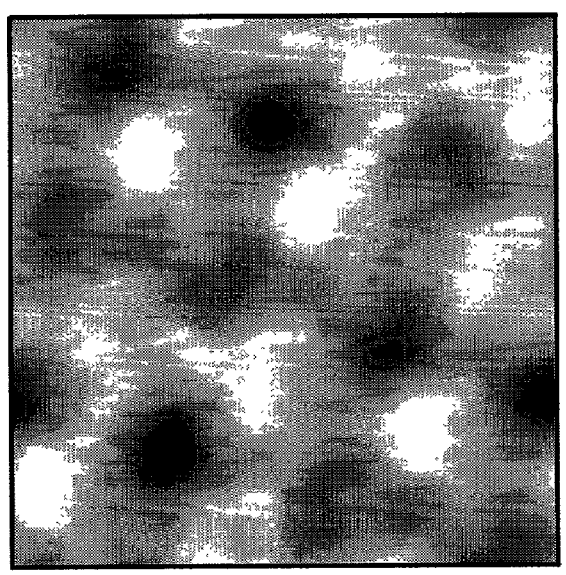
FIG. 17A is a diagram showing an image based on low-frequency components.
Figure 17B:
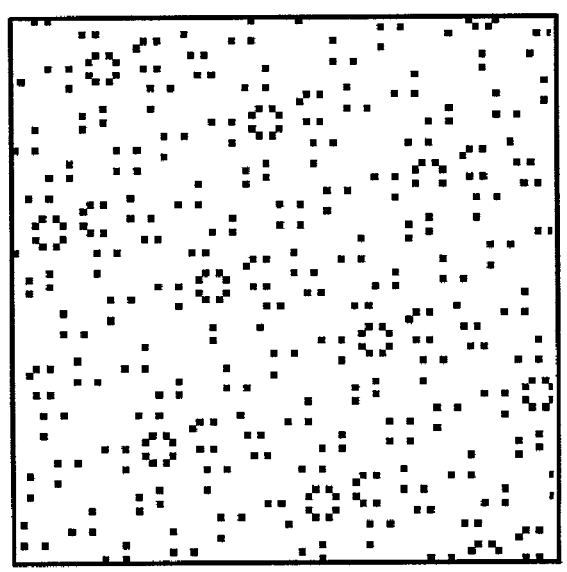
FIG. 17B is a diagram showing first blackening candidate pixels.

For the low-frequency component data L shown in FIG. 17A (identical to FIG. 15F), the blackening candidate pixel data J has been determined as shown in FIG. 17B (identical to FIG. 13).

Figure 18A:
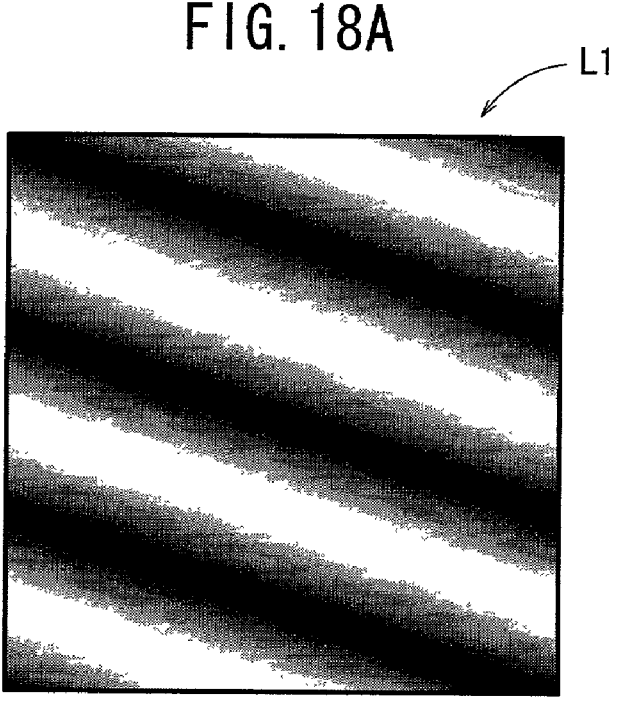
FIG. 18A is a diagram showing an image based on the strongest of the low-frequency components.

FIG. 18A shows frequency component data L1 in the real space which has been divided as the particular frequency component f2 (intensity Pb) in step S107 and whose frequency component intensity is the largest.

Figure 18B:
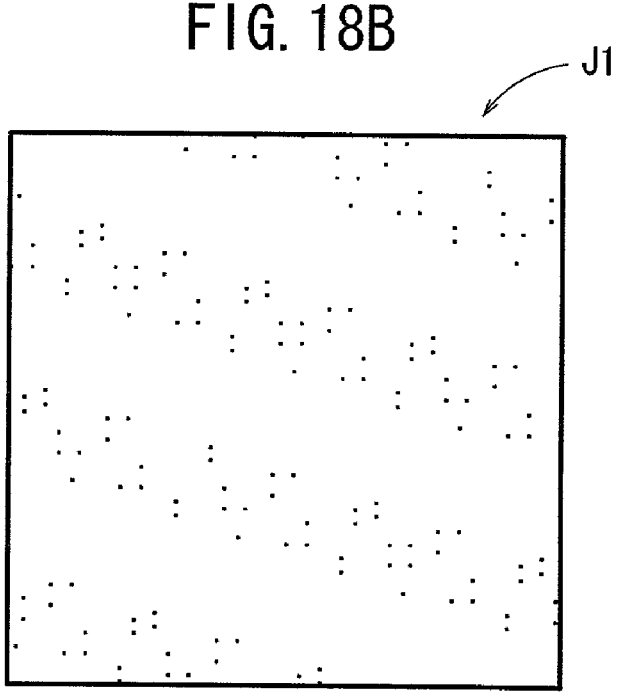
FIG. 18B is a diagram showing blackening candidate pixels where the strongest low-frequency component is not intensified.

FIG. 18B shows blackening candidate pixel data J1 which has been left by the blackening candidate pixel excluding process in steps S108, S109 and whose frequency component intensity is small. The blackening candidate pixel data J1 is data which is left when blackening candidate pixels corresponding to the regions of the strong intensity (shown black in FIG. 18A) are removed from the blackening candidate pixel data J in the combination of the blackening candidate pixel data J shown in FIG. 17B and the frequency component data L1 shown in FIG. 18A. Stated otherwise, the blackening candidate pixel data J1 is data represented by blackening candidate pixels left in the regions corresponding to the regions of the weak intensity (shown white in FIG. 18A).

In the frequency component data L1 corresponding to the particular frequency component (basic frequency component) f2 shown in FIG. 18A, there appear bright and dark regions over about three periods from the lower left side to the upper left side, and a signal A representing such bright and dark regions can be expressed by $A = a \cdot \sin(2\pi f2 \cdot r) + b$ (a represents the amplitude, $\pi$ the circle ratio, r the time, and b an offset value). The signal A has a maximum value (a+b) (a value on the central line of each of black strip region in FIG. 18A) and a minimum value (-a+b) (a value on the central line of each of white strip region in FIG. 18A). The strong intensity of a particular frequency component means that the intensity is greater than the offset value b, and the weak intensity of a particular frequency component means that the intensity is smaller than the offset value b. Therefore, if a pixel having a weak frequency component (indicated as a dot in FIG. 18B) is blackened, then the original particular frequency component (basic frequency component) is considered as being weakened. In each of FIGS. 17A through 21A, the maximum value of the original particular frequency component (basic frequency component) is indicated as black, and the minimum value thereof as white.

If the number of candidate pixels of the remaining blackening candidate pixel data J1 is not the predetermined number, i.e., if the answer to step S110 is negative, then step S107 is carried out again to narrow down blackening candidate pixels using the frequency component data L2 (FIG. 19A) in the real space which has been converted from the particular frequency component f4 (intensity Pd) and which has the second strongest frequency component intensity.

Figure 19A:
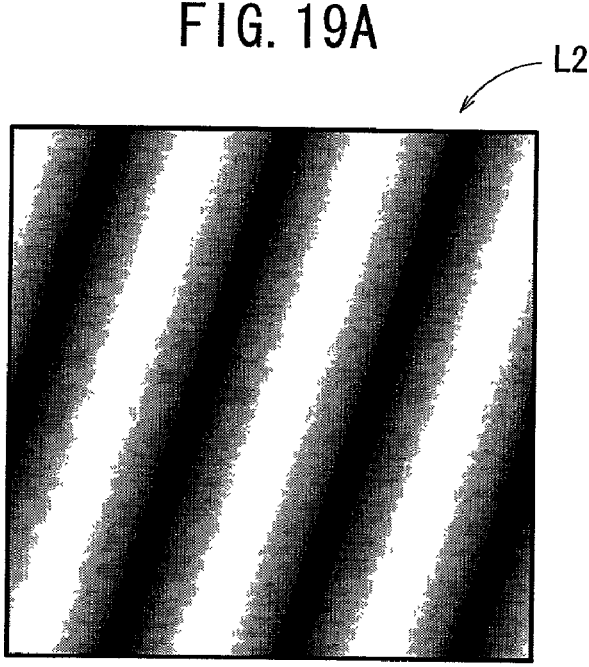
FIG. 19A is a diagram showing an image based on the second strongest low-frequency component.
Figure 19B:
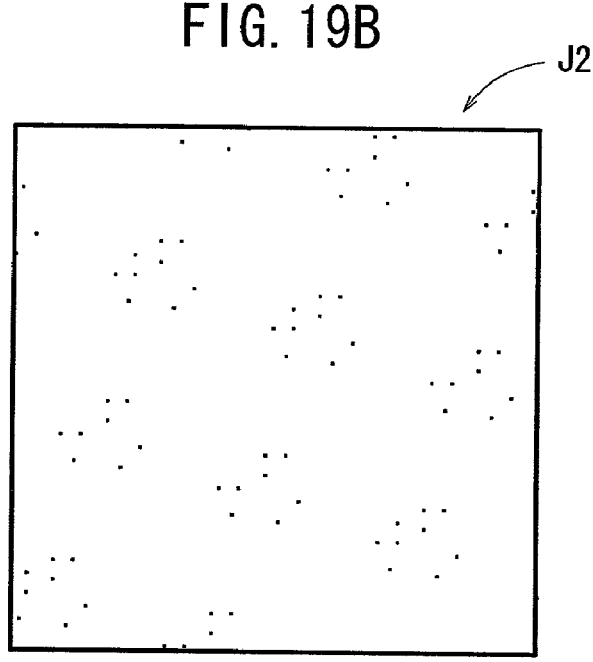
FIG. 19B is a diagram showing blackening candidate pixels where the second strongest low-frequency component is not intensified.

FIG. 19B shows blackening candidate pixel data J2 which has been left by the blackening candidate pixel excluding process in steps S108, S109, performed second time, and whose frequency component intensity is small.

The blackening candidate pixel data J2 is data represented by remaining blackening candidate pixels in the regions corresponding to white regions in FIG. 19A in the combination of the blackening candidate pixel data J1 shown in FIG. 18B and the frequency component data L2 shown in FIG. 19A.

Figure 20A:
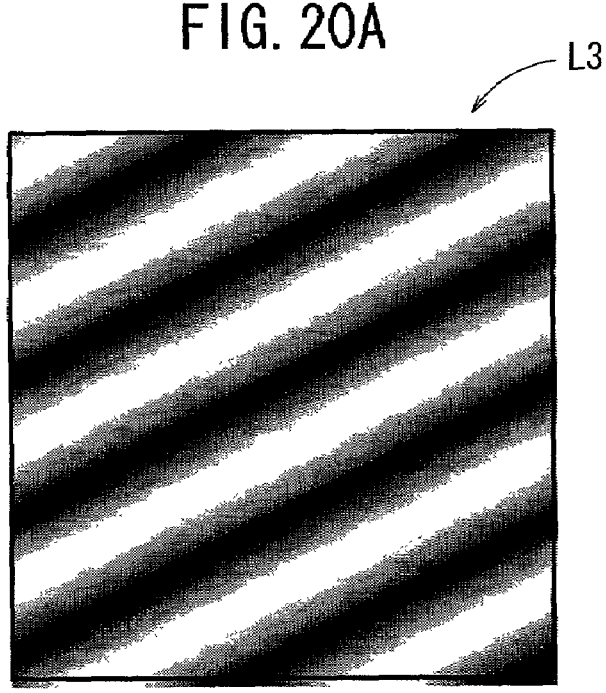
FIG. 20A is a diagram showing an image based on the third strongest low-frequency component.
Figure 20B:
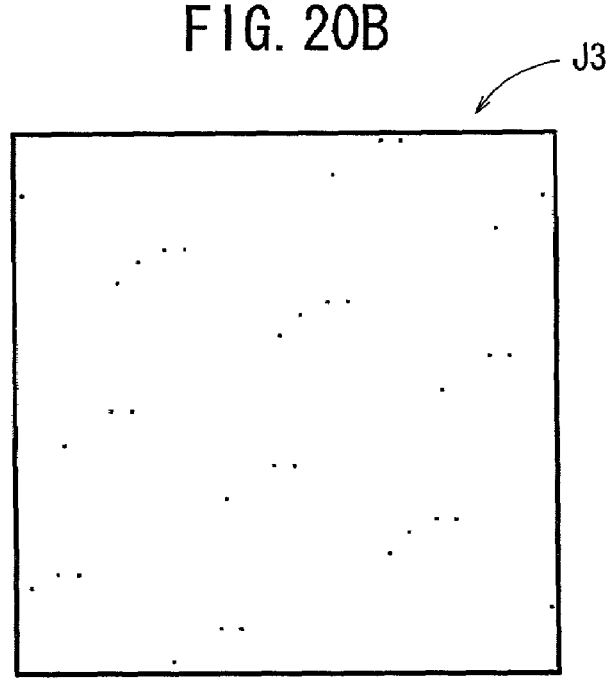
FIG. 20B is a diagram showing blackening candidate pixels where the third strongest low-frequency component is not intensified.
Figure 21A:
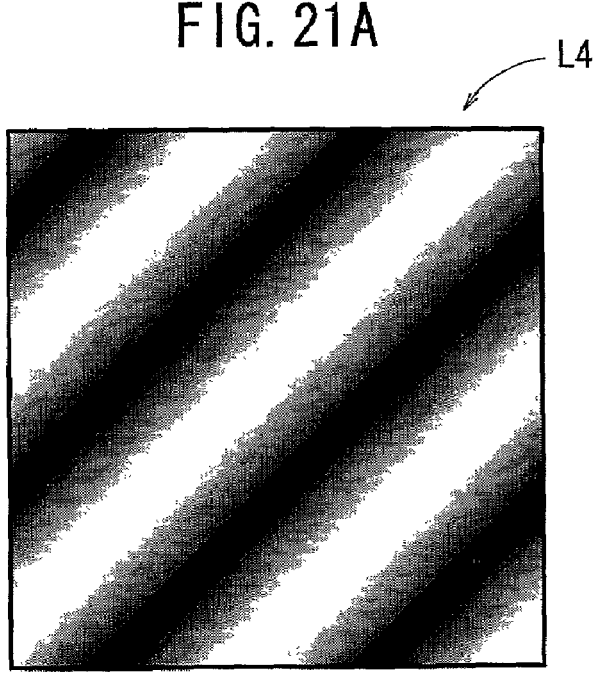
FIG. 21A is a diagram showing an image based on the fourth strongest low-frequency component.
Figure 21B:
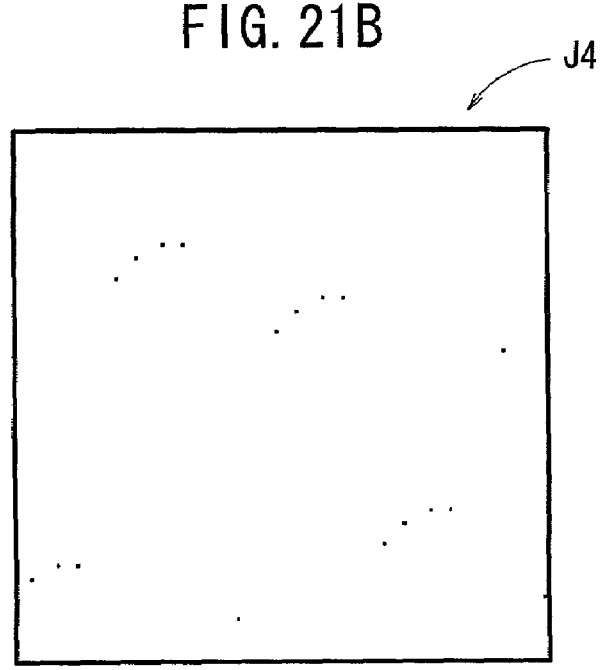
FIG. 21B is a diagram showing blackening candidate pixels where the fourth strongest low-frequency component is not intensified.

Frequency component data L3, L4 in the real space which have the third and fourth strongest frequency component intensities are shown in FIGS. 20A and 21A, respectively. FIGS. 20B and 21B show blackening candidate pixel data J3, J4, respectively, which have been left by the blackening candidate pixel excluding process in steps S108, S109 and whose frequency component intensities are small.

The positions of the predetermined number of blackening candidate pixels thus left (the number of blackening pixels per gradation of the supercell) are determined as the positions of blackening pixels for the next gradation GR (GR←GR+1).

In step S111, whitening candidate pixels are selected in order to return the halftone image data H (temporarily stored in the image data storage unit 31 of the next gradation to which the blackening pixels of the next gradation GR (GR←GR+1) have been applied in the process up to step S110, to the halftone image data H of the original gradation GR.

Figure 22:
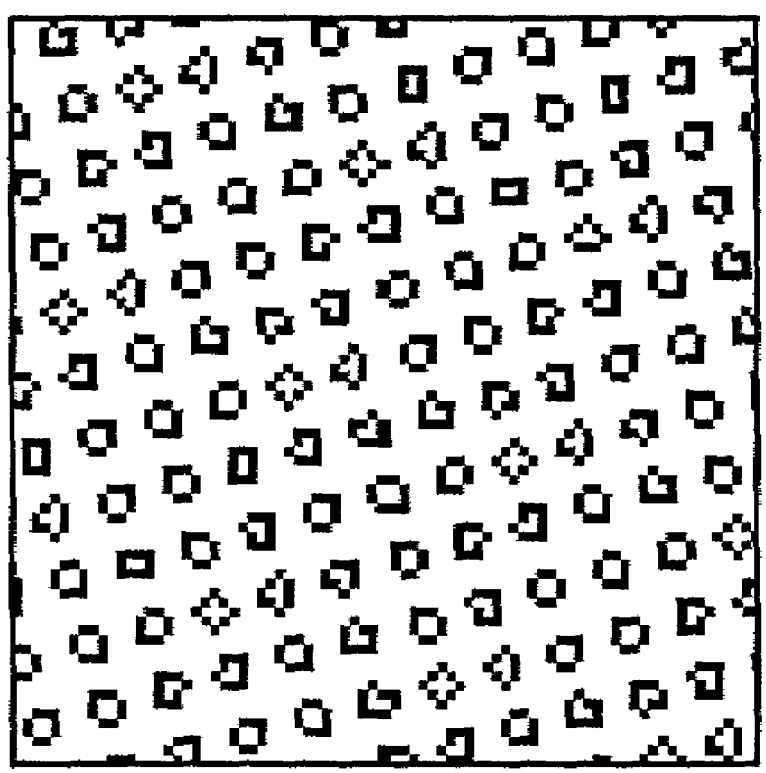
FIG. 22 is a diagram showing whitening candidate pixels.

FIG. 22 shows whitening candidate pixel data K. The whitening candidate pixel data K represent blackening pixels, as whitening candidate pixels, which form the profiles of respective dots represented by the halftone image data H of the gradation GR (GR←GR+1) next to the certain gradation GR to which the blackening pixels determined in step S110 have been applied.

In step S112, the halftone image data H representing the whitening candidate pixels determined in step S111 which are converted into white pixels is simulated by the density simulator 33 in the same manner as with step S103, generating density image data Hd.

In step S113, as with step S104, the low-frequency component extractor 45 extracts low-frequency component data L from the density image data Hd. Specifically, the low-frequency component extractor 45 weights the density image data Hd according to the human visual characteristics 65, and extracts low-frequency component data L whose frequencies are lower than the basic frequency component of the dots.

In step S114, as with step S105, the particular frequency component divider 70 divides the low-frequency component data L into particular frequency component data (basic frequency component data) Q.

In step S115, as with step S106, the rearranger 74 rearranges the intensities of the particular frequency component data.

In step S116, as with step S107, the extracted frequency components are converted into frequency components in the real space by the IFFT 76 in intensity reducing order.

In step S117, as with step S108, the intensity calculator 78 calculates the intensities of the extracted frequency components at the respective whitening candidate pixel positions.

In step S118, as with step S109, the pixel determiner 80 excludes whitening candidate pixels in positions which weaken the extracted frequency components from the candidates. Stated otherwise, the pixel determiner 80 leaves whitening candidate pixels whose extracted frequency components are strong in intensity.

In step S119, it is determined whether the number of remaining whitening candidate pixels, i.e., the number of pixels for converting blackening pixels into whitening pixels, is equal to a predetermined number (here, the number of blackening pixels per gradation of the supercell) or not. The process ranging from step S116 to step S118 is repeated until the condition of step S119 is satisfied.

The positions of the predetermined number of whitening candidate pixels thus left (the number of blackening pixels per gradation of the supercell) are determined as the positions of whitening pixels for the present gradation GR.

In this manner, the halftone image data H (H←H') after the pixel layout has been corrected at the present gradation GR with a single-plate moiré suppressed is obtained.

The process ranging from step S101 to step S119 can be carried out until a given condition in step S120 is satisfied.

The given condition is that a maximum value of the low-frequency component intensities selected in step S106 and step S115 is stored, and the processing is continued while the maximum value of the low-frequency component intensities is decreasing in the process from step S1 to step S119, and is finished when the maximum value of the low-frequency component intensities stops decreasing. Another condition which may be used is that an allowable value for the low-frequency component intensities selected in step S106 and step S115 is established, and the processing is finished when a calculated maximum value of the low-frequency component intensities becomes equal to or smaller than the allowable value.

Figure 23:
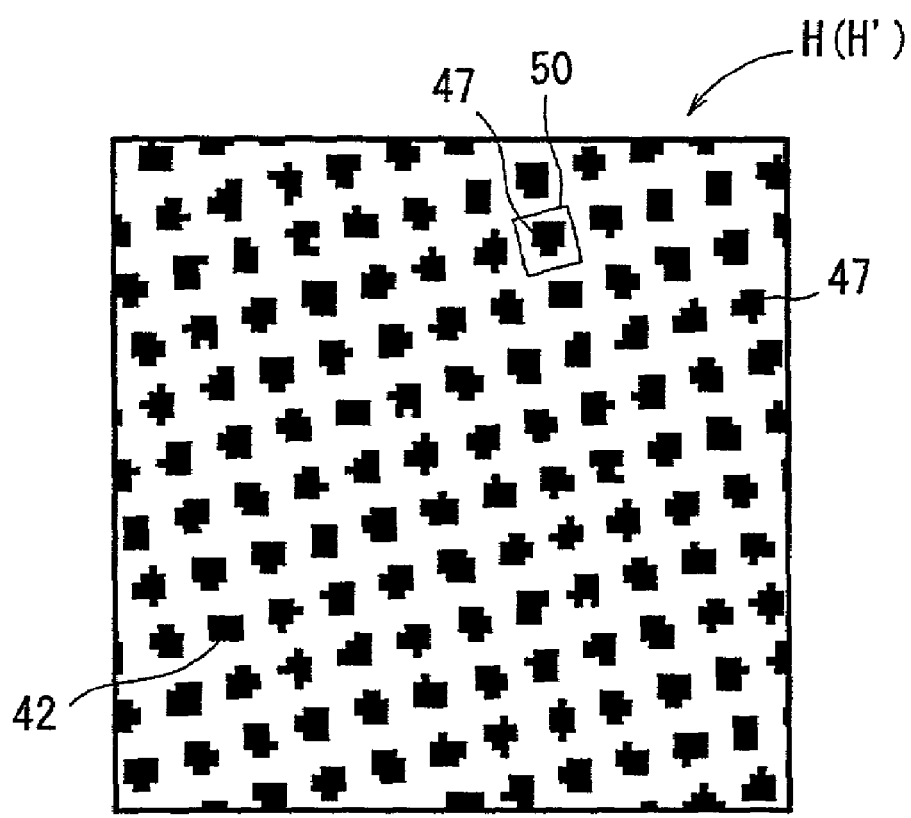
FIG. 23 is a diagram showing an image in a position space which is represented by halftone image data where blackening pixels are corrected in position.

FIG. 23 shows halftone image data H (H←H') after the pixel layout has been corrected at the present gradation GR. FIG. 12 shows halftone image data H before the pixel layout is corrected at the present gradation GR. It can be seen that in the halftone image data H (H←H') shown in FIG. 23, a dot 47 in a dot cell 50 is changed to a dot 47 of the halftone image data H shown in FIG. 12.

Figure 24:
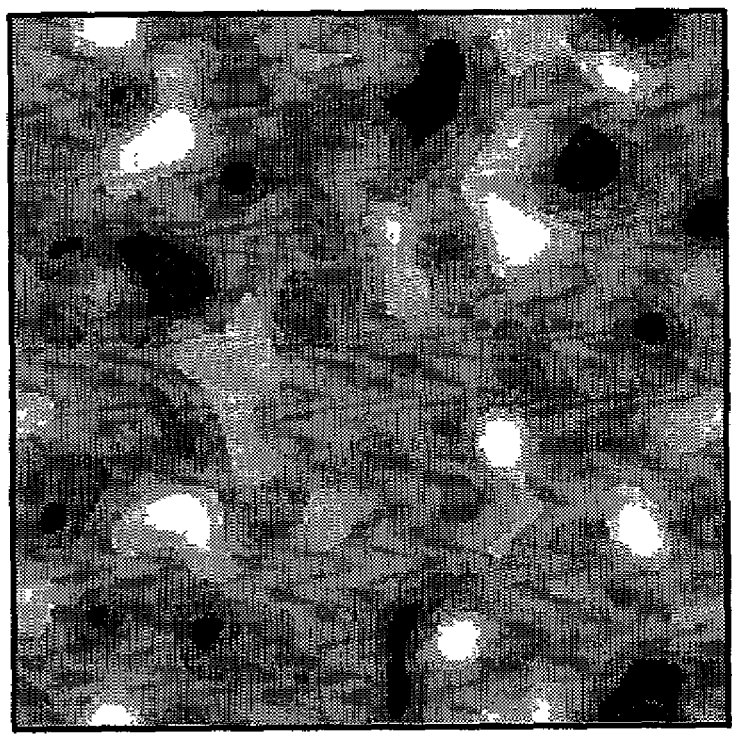
FIG. 24 is a diagram showing an image based on low-frequency components after a moiré component has been suppressed.

FIG. 24 shows low-frequency component data L (L←L') which is extracted by the low-frequency component extractor 45 from density image data Hd (Hd←Hd') which is converted by the density simulator 33 from the halftone image data H (H←H') after the pixel layout has been corrected.

It can be understood that a single-plate moiré component visible with the low-frequency component data L shown in FIG. 17A is not visible with the low-frequency component data L (L←L') shown in FIG. 24 based on the halftone image data H (H←H') after the pixel layout has been corrected.

According to the process for correcting the layout of pixels of halftone image data H with the threshold array generating apparatus 18, described above with reference to FIG. 11, for correcting the layout of blackening pixels in halftone image data H of a certain gradation which is made up of a clustered pattern of dot cells having dots composed of one or more blackening pixels, the low-frequency component extractor 45 and the pixel determining processor 54 extract low-frequency components whose frequencies are equal to or lower than the screen frequency from the halftone image data H, and then analyzed for frequencies, thereafter the intensities of the pixels analyzed for frequencies and the intensities of the pixels making up the halftone image data H are compared with each other, and the blackening pixel positions are corrected such that the analyzed frequency components will not be emphasized. In this manner, a moiré component which is a low-frequency noise component in the halftone image data H can be reduced.

In the above embodiment, corrective candidates for blackening pixel positions are among the halftone image data of the next gradation. However, corrective candidates for blackening pixel positions may be among the halftone image data of the present gradation.

Specifically, in a process for correcting the layout of blackening pixels in halftone image data H of a certain gradation which is made up of a clustered pattern of dot cells having dots composed of one or more blackening pixels, the process in step S102 comprises a process of selecting, one or more blackening pixels, as whitening candidate pixels, of blackening pixels which form the profiles of respective dots represented by the halftone image data H of the certain gradation.

The process in step S108 comprises a process of determining the intensities of the whitening candidate pixel positions in the intensity-modulated image expressed by the divided frequency components.

The process in step S109 comprises a process of determining, as whitening pixels, the whitening candidate pixels whose intensities of the whitening candidate pixel positions are strong.

The process in step S111 comprises a process of selecting one or more pixels, as blackening candidate pixels at the certain gradation, of the whitening pixels in the periphery of the blackening pixels which form the profiles of respective dots making up the halftone image data at the certain gradation corrected by the determined whitening pixels.

The process in step S117 comprises a process of determining the intensities of the whitening candidate pixel positions in the intensity-modulated image data expressed by the divided frequency components.

The process in step S118 comprises a process of determining, as blackening pixels at the certain gradation, the whitening candidate pixels whose intensities of the whitening candidate pixel positions are strong.

In this manner, the pixel positions in the halftone image data H of the present gradation GR can be corrected.

A process of determining a threshold array 36 of all gradations based on halftone image data H with an optimum dot layout having a single-plate moiré reduced by correcting the layout of blackening pixels at a certain gradation GR (the reference characters GR will hereinafter be omitted for an easier understanding of the present invention), or appropriate prepared halftone image data H of a predetermined gradation, will be described below with reference to flowcharts illustrated in FIGS. 25 and 26. The flowcharts illustrated in FIGS. 25 and 26 are connected to each other by connectors ①, ②.

Figure 25:
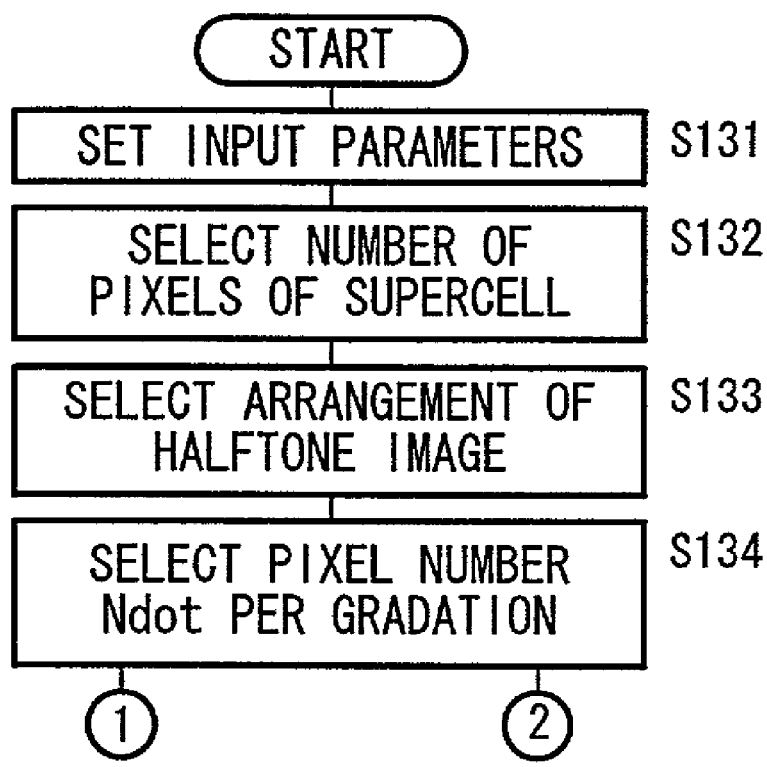
FIGS. 25 and 26 are flowcharts of a process of determining a threshold array from a dot pattern.
Figure 26:
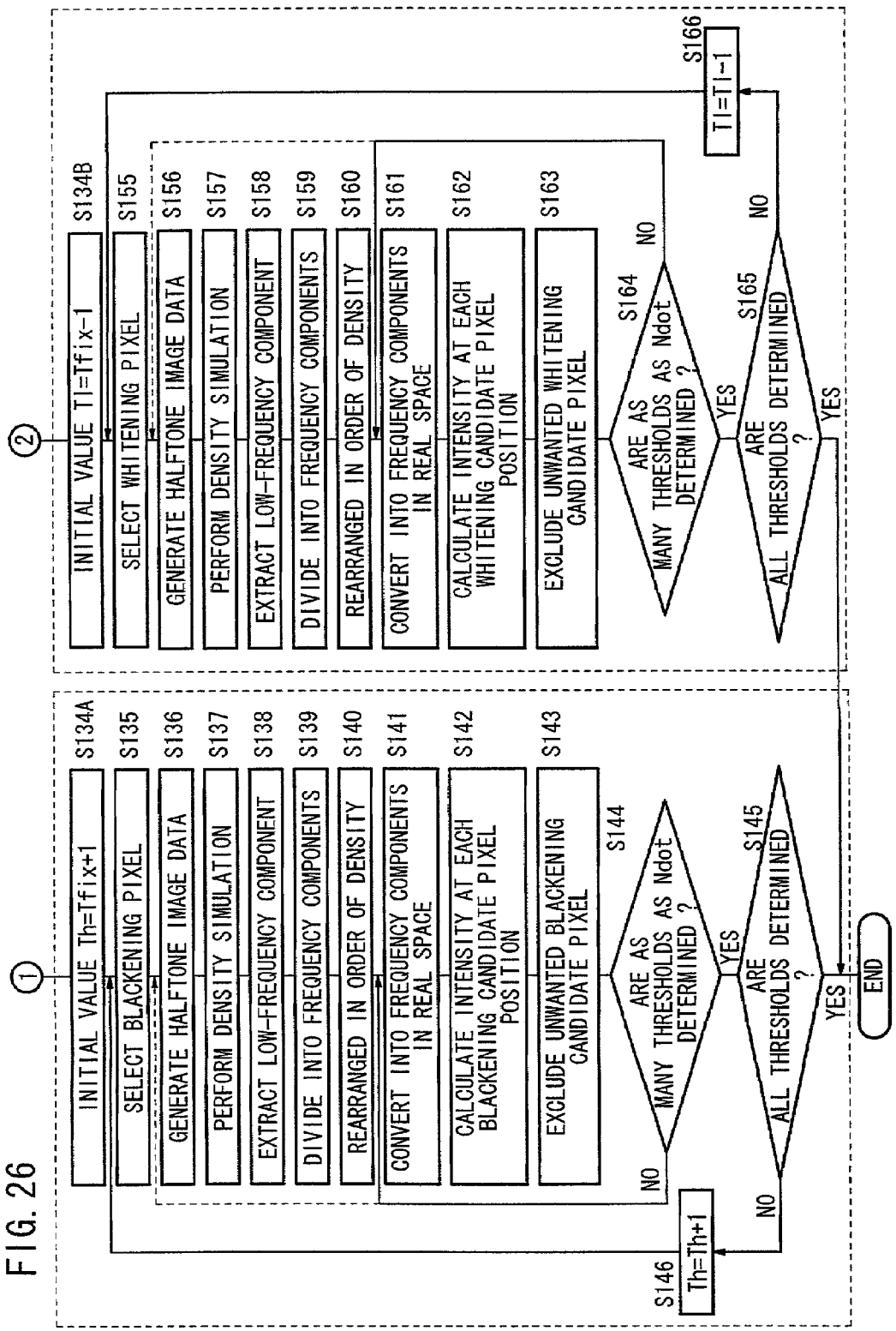

The process shown in FIGS. 25 and 26 is capable of obtaining a threshold array 36 for avoiding a single-plate moiré at all gradations.

In step S131, the parameter input unit 37 sets input parameters from halftone image data H of a certain gradation. For example, the input parameters include a screen ruling of 175 lpi (=6.89 lines/mm), a screen angle of 15 degrees, an output resolution of 1200 dpi (=47 dots/mm (or pixels/mm)) (one pixel has a square size having sides each about 21 µm long), and a square screen shape. The screen shape may be a circular or any other geometrical shape other than the square shape.

The substantial ruling angle selector 39 selects the number of pixels of a supercell (threshold array 36) as a threshold array in step S132, selects an arrangement of a halftone image (size, number, and angle) in step S133, and selects a pixel number Ndot per gradation in step S134.

Figure 27:
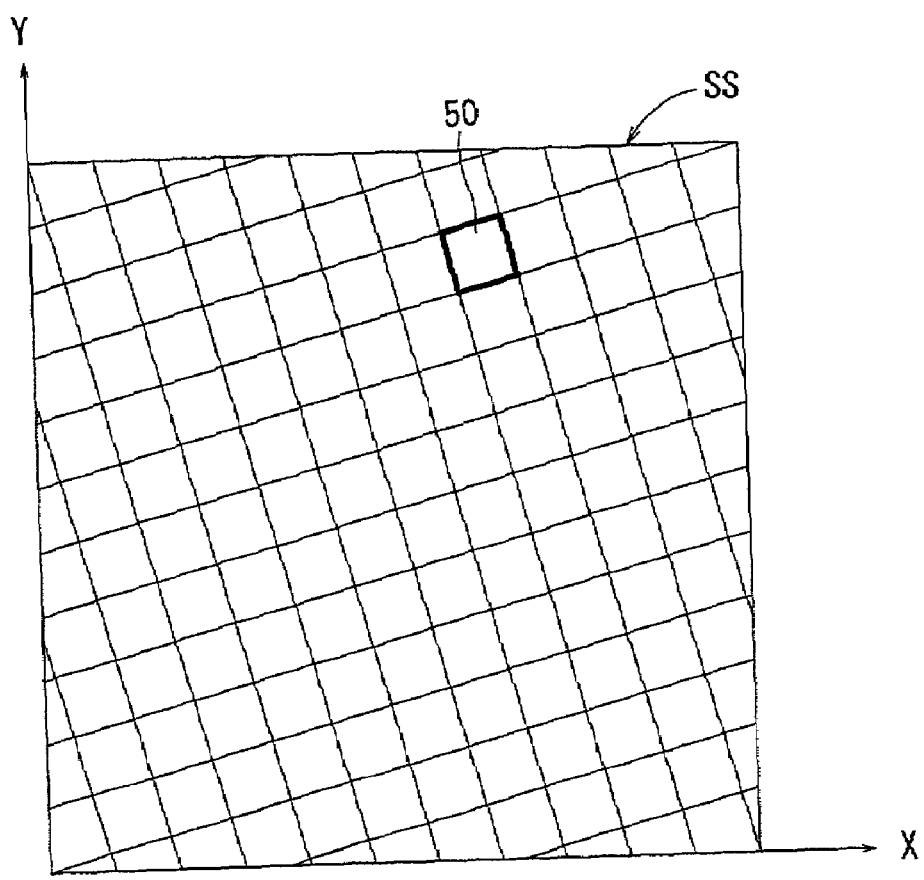
FIG. 27 is a diagram illustrative of the setting of input parameters.

FIG. 27 shows a single supercell SS composed of columns of halftone dots (dot cells) 50 formed according to the set input parameters.

The pixel number Ndot per gradation in the supercell SS is determined by the following equation (1):

Ndot=(pixel number of supercell)/(gradation number)     (1)

This means that when the number of required gradations is 256, there are Ndot thresholds T to be provided in the threshold array 36M which is being generated, or stated otherwise, there are Ndot thresholds T=1, T=2, ..., T=255 provided in the threshold array 36.

In the present embodiment, a process of determining thresholds 1 through 255 with respect to an instance where 256 gradations are required will be described. Alternatively, if the total number of pixels in the supercell SS is indicated by Nall, then thresholds 1 through Nall may be calculated and divided by the number Ndot of pixels per gradation to produce thresholds 1 through 255. With the thresholds 1 through Nall being calculated, even if the number of required gradations is changed, thresholds can easily be produced by changing the number Ndot of pixels per gradation which serves as a divisor.

FIG. 23 referred to above shows halftone image data H (H←H') formed according to a pattern of dots 47 given at a certain gradation. The halftone image data H (H←H') comprises a plurality of dots 50.

In step S134A, an initial value of one or more thresholds Th of the same value of a next gradation higher than the above certain gradation is set to Tfix+1.

In step S135 (step (A)), for determining the positions of one or more thresholds Th of the same value of the next gradation higher than the above certain gradation, one or more candidate positions for the positions of one or more thresholds Tfix+1 of the same value of the next gradation higher than the above certain gradation are selected based on the dot pattern with respect to the threshold Tfix of the certain gradation.

The number of thresholds for one gradation in the threshold array 36 is assumed to be Ndot.

For selecting the positions of one or more thresholds Tfix+1 of the same value of the next gradation higher than the above certain gradation, the shape of the screen is not impaired in step S135. The candidate positions correspond to the positions of candidate pixels to be blackened next, and hence are referred to as blackening candidate pixels.

If the number of blackening candidate pixels is m, then it is selected as m=Ndot+α, e.g., Ndot×2. If the margin α is increased, then the degree of freedom of the threshold array is increased, but the blackening shape of the screen, or the square shape in this example, is lost. The blackening candidate pixels should preferably be selected to satisfy the halftone dot characteristics (ruling, angle, and shape) set in step S131, and it is necessary to calculate pixels around the pixels which are currently being blackened in order to keep the periodicity of the dots.

Figure 28:
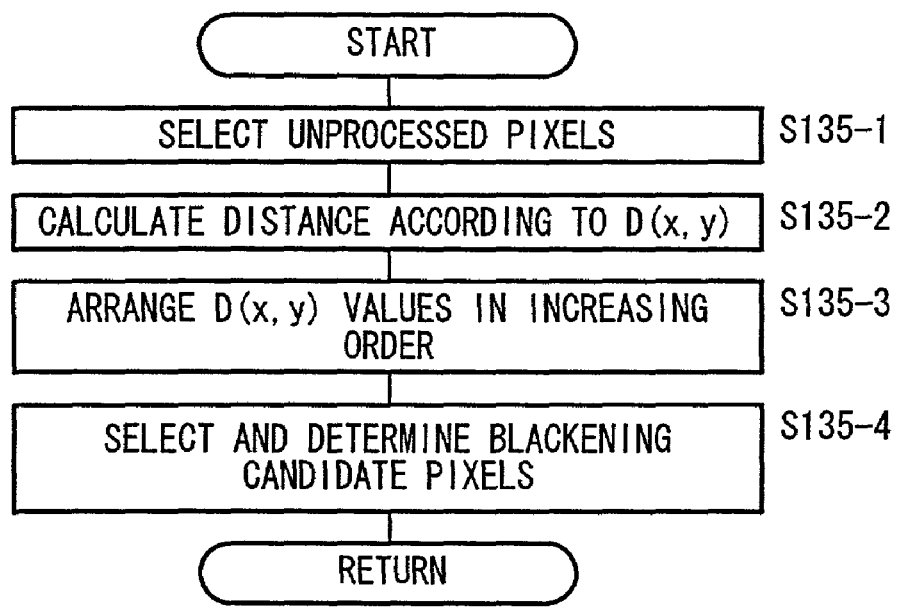
FIG. 28 is a flowchart of a detailed process of selecting a blackening candidate pixel in the process of determining a threshold array shown in FIG. 26.

FIG. 28 shows a process of selecting blackening candidate pixels in step S135.

Figure 29:
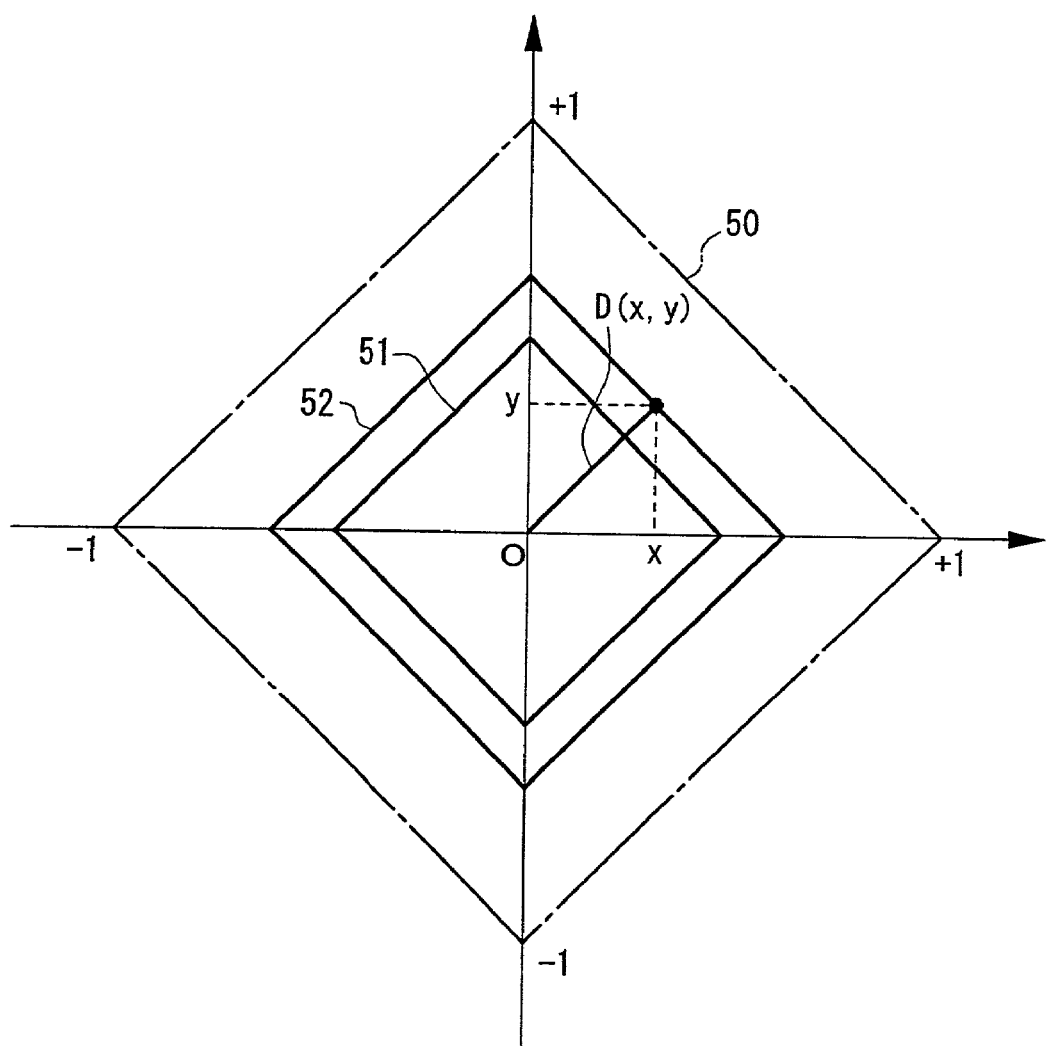
FIG. 29 is a diagram illustrative of a distance function.

In step S135-1, unprocessed pixels which have not yet been blackened are selected. In step S135-2, a distance is determined with respect to each of the unprocessed pixels selected in step S135-1, as follows:

As schematically shown in FIG. 29, the distance from the center O of each dot 50 whose size has been standardized to ±1 to an unprocessed pixel, i.e., to a pixel position where a threshold is not provided, is determined according to the following distance function D (x, y) which meets a desired shape of square:

$$D(x,y)=1-(|x|+|y|) \quad (2)$$

In FIG. 29, if a threshold array within a square 51 including the center O has been determined, then the distance up to an unprocessed pixel near a side of a square 52 is determined according to the distance function D (x, y).

If a blackened region is of a circular thick dot shape, then the distance function D (x, y) may be expressed by the following equation (3):

$$D(x,y)=1-(x^2+y^2) \quad (3)$$

The distance function D (x, y) corresponds to a so-called spot function, and may be any of various functions depending on the desired screen shape.

In step S135-3, the values of the distance functions D (x, y) of the respective unprocessed pixels are rearranged in increasing order.

In step S135-4, the values of the distance functions D (x, y) determined in step S135-3 are selected in increasing order until the number of blackening candidate pixels as unprocessed pixels is equalized to m (m=Ndot+α).

When m blackening candidate pixels are selected, the candidate pixel selector 41 transfers the pixel positions of the selected m blackening candidate pixels to the pixel determining processor 54. The blackening candidate pixels are represented by data similar to the candidate pixel data J shown in FIG. 17B.

In step S136, halftone image data H as gradation image data is generated by the comparator 32 based on the threshold array 36M which is being generated where an already determined threshold array is stored.

If a dot pattern of a certain gradation is given, the threshold array 36M which is being generated has all thresholds in an area corresponding to the dot pattern (blackened area), set to the threshold T (T=Tfix) at the certain gradation. When the position of the threshold Th (Th=Tfix +1) at the next gradation higher than the certain gradation is determined according to a process to be described below, the threshold array 36M which is being generated is composed of the threshold Tfix of the certain gradation and the threshold Tfx+1 of the next gradation.

The image data G based on which the halftone image data H is generated is set to T. Specifically, for determining the halftone image data H representing a threshold array of already determined thresholds T (T=Tfix) if the position of the threshold T (initially T=Tfix+1) of the next gradation is to be determined, the image data generator 30 supplies the constant value Tfix as the value of the image data G by a supercell threshold size to the comparator 32. Thus, for determining the position of a threshold T (T=Tfix+2) of the next gradation, the constant value G=Tfix+1 is supplied by a supercell threshold size to the comparator 32.

FIG. 23, therefore, shows a halftone image represented by the halftone image data H based on a single supercell SS which is generated by the comparator 32 using the threshold array 36M which is being generated when the image data G is T.

In FIG. 23, the halftone image data H comprises a screen tint (a dot pattern of uniform density which is composed of dots having a substantially constant dot %). The basic frequency of the halftone dots is equal to the actual screen ruling.

The candidate pixel data J is selected in the same manner as with the data shown in FIG. 17B. The blackening candidate pixels are selected to satisfy the halftone dot characteristics (ruling, angle, and shape) set in step S131, and selected from pixels around the pixels already blackened with the halftone image data H (H←H') shown in FIG. 23.

In step S137, density image data Hd as shown in FIG. 15D, corresponding to a density image obtained from the halftone image data H, is obtained by a simulation in the same manner as with step S103.

In step S138 (first step), as with step S104, the low-frequency component extractor 45 extracts low-frequency component data L from the density image data Hd.

The low-frequency component data L is supplied from the low-frequency component extractor 45 to the pixel determining processor 54.

In step S139 (second step), as with step S105, the FFT 72 of the particular frequency component divider 70 in the pixel determining processor 54 divides the low-frequency component data L into particular frequency components (basic frequency components) which may possibly be generated with the density image data Hd generated based on the threshold array 36 (see FIG. 19A).

In step S140, as with step S106, the rearranger 74 rearranges the intensities of the particular frequency components.

In step S141, as with step S107, the extracted frequency components are converted into frequency components in the real space by the IFFT 76 in intensity reducing order.

In step S142 (third step), as with step S108, the intensity calculator 78 calculates the intensities of the extracted frequency components at the respective whitening candidate pixel positions.

In step S143 (fourth step), as with step S109, the pixel determiner 80 excludes blackening candidate pixels in positions which intensify the extracted frequency components from the candidates. Stated otherwise, the pixel determiner 80 leaves blackening candidate pixels whose extracted frequency components are strong in intensity.

In step S144 (fifth step), as with step S110, it is confirmed whether the number of remaining blackening candidate pixels is equal to the number Ndot of blackening pixels per gradation or not. The process ranging from step S141 to step S143 is repeated until the number of remaining blackening candidate pixels becomes equal to the number Ndot of blackening pixels per gradation, thus narrowing down candidates.

The positions of as many blackening candidate pixels, thus left, as the number Ndot of pixels per gradation are determined as the positions of thresholds for the next gradation.

If the answer to step S144 is affirmative, i.e., if thresholds corresponding to all the blackening pixels as many as the number Ndot of pixels per gradation are determined, then the pixel determining processor 54 determines in step S145 whether a threshold array up to the maximum threshold T=255 has been determined or not. If a threshold array has not been determined, then the threshold Th of the next gradation is set to Th+1 in step S146, and the process ranging from steps S135 through S145 are repeated until a threshold array up to the maximum threshold T=255 is determined. Then, the process of determining a threshold array of a higher gradation is finished.

By thus determining a threshold array, a finally left blackening candidate pixel that is a pixel which does not intensify the frequency components of the original dot pattern can be selected as a next blackening pixel. In view of the weakening of the frequency component with respect to only the basic frequency having the maximum amplitude, the position of the minimum value of the particular frequency component (basic frequency component) having the maximum amplitude is selected as the position of a next blackening candidate pixel. At this time, the particular frequency component (basic frequency component) having the second largest amplitude may be intensified. According to the algorithm described above, however, a next blackening pixel may be located in an optimum position which does not intensify, but weakens, any of the basic frequency components having relatively large intensities.

For determining the positions of as many thresholds as the number Ndot of pixels for a certain gradation, one or plural positions may be determined at a time in order to make the screen shape preferable, or as square as possible, and steps S136, S137, S138, S139, S140, S141, S142, S143, and S144, including the broken-line flow, shown in FIGS. 25, 26, are repeated.

Even if the thresholds for one or Ndot pixels are to be selected, when the algorithm shown in FIGS. 25, 26 is carried out, more pixels than actually desired may be left or the number of candidate pixels may be smaller than a target number after step S143. If more pixels than actually desired are left, then candidate pixels may be selected in the order under other conditions in step S144 to achieve a desired number of candidate pixels. The order under the other conditions may be decreasing order of the sums of the intensities of divided frequency components at each pixel or order of distances D representative of a shape, for example. If the number of candidate pixels is smaller than a target number, then control goes back to a step preceding step S143 to increase the number of candidate pixels, and the above process is carried out to obtain a desired number of candidate pixels.

Similarly, if the process in steps S134B, S155 through S166 is carried out to determine the position of a threshold T at a next gradation lower than the certain gradation, then the threshold is set to 255 (to make pixels white at all times) so as not to select those pixels whitened according to a dot pattern of the halftone image data H corresponding to the threshold Tfix of the certain gradation, as whitening candidate pixels, and the positions of thresholds represented by Tfix−1 and lower are successively determined. Step S134B serves to set an initial threshold Tl=Tfix−1, and step S166 serves to update the threshold T to a threshold Tl (Tl=Tl−1) of a next lower gradation.

In step S155 (step (A)), as with step S135, a plurality of candidate positions for the positions of plural thresholds T1 of the same value of the next lower gradation are selected so as not to impair the screen shape. The candidate positions correspond to the positions of candidate pixels to be whitened next, and hence are referred to as whitening candidate pixels.

For determining the positions of thresholds Th, Tl of next gradations, after all positions of the thresholds Th of higher gradations are determined, the positions of the thresholds Tl of lower gradations may be determined independently; or the positions of thresholds Th, Tl of next gradations may simultaneously be determined one gradation at a time.

The threshold array 36M with the entire threshold array being determined is handled as the threshold array 36. The data of the threshold array 36 is recorded in the storage medium 49, and then copied from the storage medium 49 to the threshold array 36 in the platemaking system 10 shown in FIG. 1.

Similarly, when new input parameters (a screen ruling, a screen angle, an output resolution, a screen shape, etc.) are set in step S131, the threshold array of a threshold array 36 corresponding to those new input parameters can be determined substantially automatically.

For printing a color image, it is necessary to produce the plates of four colors, i.e., C (cyan), M (magenta), Y (yellow), and K (black). Therefore, the threshold arrays 36 for the plates of four colors at different angles (usually 0° (e.g., Y), 15° (e.g., C), 45° (e.g., M), and 75° (e.g., K) are generated according to the above algorithm.

In the above embodiment, the binary halftone image data H are processed. However, the principles of the present invention are not limited to the binary halftone image data H, but are also applicable to multi-valued halftone image data such as four-valued halftone image data having output values "0, 1, 2, 3", eight-valued halftone image data, etc.

The platemaking system 10 shown in FIG. 1 where the threshold array 36 thus generated is set is capable of producing a film F carrying an image as a dot pattern substantially free of a single-plate moiré even under the output conditions where it has heretofore been difficult to produce a film due to a single-plate moiré, e.g., the resolution is 1200 dpi and the screen ruling is 175 lpi, or generally, under the output condition where the ratio of the output resolution (dpi) to the screen ruling (lpi) is 10 or smaller.

In the above embodiment, a process of determining the positions of thresholds in a method of reproducing a gradation image using a threshold array has been described above. The present invention serves to successively determine which threshold array is an optimum arrangement in respective gradations. As can easily be understood by those skilled in the art, the layout of dots of each gradation is applicable to another gradation reproducing technique such as a density pattern method in which one pixel of a grayscale image is associated with a submatrix of Z×Z dots and the density of each pixel is reproduced by the area ratio of blackening dots in the submatrix.

According to the present invention, as described above, it is successively determined which threshold array is an optimum arrangement in respective gradations. In the above embodiment, dots according to an AM screen, in which dots having substantially uniform sizes are arranged at substantially equal intervals in rows and columns perpendicular thereto, representing the gray scale with the sizes of dots 1 have been described. The present invention is also applicable to the reduction of a low-frequency component generated in relation to a threshold array in a gradation reproducing process based on an array of other than dots, e.g., an FM screen in which dots are irregularly arranged and the gray scale is represented by the density of dots. The present invention can be applied to such a method if the conditions of candidate pixels selected by the candidate pixel selector 41 (as shown in FIG. 10) are properly changed.

If an FM screen is employed, then a filter according to only the human visual characteristics may be used as low-pass filter 42, and any filtering according to a low-pass filter corresponding to the screen ruling at the dot period is not required.

According to the present invention, as described above, it is possible to eliminate or reduce low-frequency noise such as a single-plate moiré can be reduced because low-frequency components of an image of a certain gradation which is made up of a clustered pattern of dots comprising one or more blackening pixels, and thereafter analyzed for frequencies to correct the positions of the blackening pixels.

According to the present invention, it is also possible to determine a threshold array with minimized low-frequency components such as periodic patterns, single-plate moiré, etc. based on a predetermined dot pattern.

Although certain preferred embodiments of the present invention have been shown and described in detail, it should be understood that various changes and modifications may be made therein without departing from the scope of the appended clams.

What is claimed is:

1. A method of correcting a threshold array having an array of thresholds for reproducing a gradation with a dot pattern as a clustered pattern of dots each made up of one or more blackening pixels, comprising the steps of:
(A) determining at least one non-contact point candidate position to be turned into a non-contact point, among contact points of the dots at a given gradation;
(B) determining at least one contact point candidate position to be turned into a contact point, among non-contact points of the dots at said given gradation; and
(C) correcting said threshold array by switching around a threshold for the non-contact point candidate position determined in said step (A) and a threshold for the contact point candidate position determined in said step (B), whereby the layout of contact points of said dots can be corrected.

2. A method according to claim 1, wherein each of said steps (A), (B) comprises the steps of analyzing, for frequencies, said dot pattern in which about half of the contact points of the dots are held in contact with other contact points, to determine particular frequency components, thereafter determining intensities of the particular frequency components at said non-contact point candidate position, determining intensities of the particular frequency components at said contact point candidate position, and determining said non-contact point candidate position and said contact point candidate position based on the magnitude of the determined intensities.

3. A method according to claim 1, wherein if said dot pattern has a resolution represented by pixels/inch and said dots have a screen ruling represented by lines/inch, then the quotient produced by dividing the resolution of said dot pattern by said screen ruling has a value of at most 10.

4. A method of correcting the layout of blackening pixels in an image of a given gradation which is formed of a dot pattern as a clustered pattern of dots each made up of one or more blackening pixels, comprising the steps of:
selecting at least one of whitening pixels around blackening pixels forming a profile of each of the dots of the image of the given gradation, as a blackening candidate pixel at a gradation next to said given gradation;
extracting a low-frequency component from said image of the given gradation;
analyzing the extracted low-frequency component for frequencies to divide the extracted low-frequency component into a plurality of frequency components, and determining an intensity of a blackening candidate pixel position in an intensity-modulated image represented by the divided frequency components;
determining said blackening candidate pixel whose intensity at the blackening candidate pixel position is weak as a blackening pixel at the next gradation;
selecting at least one blackening pixel as a whitening candidate pixel at said given gradation, among blackening pixels forming a profile of each of the dots of an image of a gradation next to said given gradation to which the determined blackening pixel is applied;

extracting a low-frequency component from the image of the gradation next to said given gradation to which the determined blackening pixel is applied;

analyzing the extracted low-frequency component for frequencies to divide the extracted low-frequency component into a plurality of frequency components, and determining an intensity of a whitening candidate pixel position in an intensity-modulated image represented by the divided frequency components; and determining said whitening candidate pixel whose intensity at the whitening candidate pixel position is strong as a whitening pixel at the given gradation.

5. A method according to claim 4, wherein said step of determining said blackening candidate pixel whose intensity at the blackening candidate pixel position is weak as a blackening pixel at the next gradation comprises the step of determining blackening candidate pixels whose intensities of at least two of the divided frequency components are weak as blackening pixels at the next gradation, and said step of determining said whitening candidate pixel whose intensity the whitening candidate pixel position is strong as a whitening pixel at the given gradation comprises the step of determining whitening candidate pixels whose intensities of at least two of the divided frequency components are strong as whitening pixels at said given gradation.

6. A method according to claim 4, wherein each of said steps of extracting a low-frequency component from the image comprises the steps of converting said image into an image predicted by calculations which is to be reproduced on a recording medium, and extracting a low-frequency component from the predicted image.

7. A method according to claim 4, wherein each of said steps of extracting a low-frequency component from the image comprises the steps of weighting said image according to human visual characteristics and extracting a low-frequency component from the weighted image.

8. A method of correcting the layout of blackening pixels in an image of a given gradation which is formed of a dot pattern as a clustered pattern of dots each made up of one or more blackening pixels, comprising the steps of:

selecting at least one of blackening pixels forming a profile of each of the dots of the image of the given gradation, as a whitening candidate pixel;

extracting a low-frequency component from said image of the given gradation;

analyzing the extracted low-frequency component for frequencies to divide the extracted low-frequency component into a plurality of frequency components, and determining an intensity of a whitening candidate pixel position in an intensity-modulated image represented by the divided frequency components;

determining said whitening candidate pixel whose intensity at the whitening candidate pixel position is strong as a whitening pixel;

selecting at least one whitening pixel as a blackening candidate pixel at said given gradation, among whitening pixels forming a profile of each of the dots of an image of said given gradation which has been corrected by the determined whitening pixel;

extracting a low-frequency component from the image of said given gradation which has been corrected by the determined whitening pixel;

analyzing the extracted low-frequency component for frequencies to divide the extracted low-frequency component into a plurality of frequency components, and determining an intensity of a blackening candidate pixel position in an intensity-modulated image represented by the divided frequency components; and determining said blackening candidate pixel whose intensity at the whitening candidate pixel position is weak as a blacking pixel at the given gradation.

9. A method according to claim 8, wherein said step of determining said whitening candidate pixel whose intensity at the whitening candidate pixel position is strong as a whitening pixel comprises the step of determining whitening candidate pixels whose intensities of at least two of the divided frequency components as whitening pixels are strong, and said step of determining said blackening candidate pixel whose intensity at the blackening candidate pixel position is weak as a blackening pixel at the given gradation comprises the step of determining blackening candidate pixels whose intensities of at least two of the divided frequency components are weak as blackening pixels at said given gradation.

10. A method according to claim 8, wherein each of said steps of extracting a low-frequency component from the image comprises the steps of converting said image into an image predicted by calculations which is to be reproduced on a recording medium, and extracting a low-frequency component from the predicted image.

11. A method according to claim 8, wherein each of said steps of extracting a low-frequency component from the image comprises the steps of weighting said image according to human visual characteristics and extracting a low-frequency component from the weighted image.

12. A method of determining a threshold array for generating an image which is formed of a dot pattern as a clustered pattern of dots each made up of one or more blackening pixels, comprising the steps of:

when the positions of one or more thresholds having the same value of a next gradation higher than a given gradation are to be determined in case a dot pattern of said given gradation is given;

(A) selecting one or more candidate positions for the positions of one or more thresholds of the next gradation higher than said given gradation, based on the dot pattern of said given gradation;

(B) determining the positions of thresholds of the next gradation higher than said given gradation among said candidate positions;

said step (B) comprising:

the first step of extracting a low-frequency component from the dot pattern of said given gradation;

the second step of dividing said extracted low-frequency component into one or more particular frequency components;

the third step of determining intensities of said particular frequency components at said candidate positions;

the fourth step of determining a candidate position whose determined intensities of said particular frequency components are weak as a position of a threshold of the next gradation higher than said given gradation; and the fifth step of repeating said first through fourth steps until all positions of one or more thresholds having the same value of the next gradation higher than said given gradation are determined.

13. A method according to claim 12, wherein the position of the threshold determined in said fourth step is determined as a candidate position whose intensity of at least two of the divided frequency components is weak.

14. A method according to claim 12, wherein said first step comprises the steps of converting said dot pattern into an image predicted by calculations which is to be reproduced on a recording medium, and extracting a low-frequency component from the predicted image.

15. A method according to claim 12, wherein said first step of extracting a low-frequency component from the dot pattern comprises the steps of weighting said dot pattern according to human visual characteristics and extracting a low-frequency component from the weighted image.

16. A method of determining a threshold array for generating an image which is formed of a dot pattern as a clustered pattern of dots each made up of one or more blackening pixels, comprising the steps of:

when the positions of one or more thresholds having the same value of a next gradation lower than a given gradation are to be determined in case a dot pattern of said given gradation is given;

(A) selecting one or more candidate positions for the positions of one or more thresholds of the next gradation lower than said given gradation, based on the dot pattern of said given gradation;

(B) determining the positions of thresholds of the next gradation lower than said given gradation among said candidate positions;

said step (B) comprising:

the first step of extracting a low-frequency component from the dot pattern of said given gradation;

the second step of dividing said extracted low-frequency component into one or more particular frequency components;

the third step of determining intensities of said particular frequency components at said candidate positions;

the fourth step of determining a candidate position whose determined intensities of said particular frequency components are strong as a position of a threshold of the next gradation lower than said given gradation; and the fifth step of repeating said first through fourth steps until all positions of one or more thresholds having the same value of the next gradation lower than said given gradation are determined.

17. A method according to claim 16, wherein the position of the threshold determined in said fourth step is determined as a candidate position whose intensity of at least two of the divided frequency components is weak.

18. A method according to claim 16, wherein said first step comprises the steps of converting said dot pattern into an image predicted by calculations which is to be reproduced on a recording medium, and extracting a low-frequency component from the predicted image.

19. A method according to claim 16, wherein said first step of extracting a low-frequency component from the dot pattern comprises the steps of weighting said dot pattern according to human visual characteristics and extracting a low-frequency component from the weighted image.

* * * * *